(12) United States Patent
Siomina et al.

(10) Patent No.: US 9,877,229 B2
(45) Date of Patent: Jan. 23, 2018

(54) METHODS ENABLING ENHANCED RECEIVERS WITH A REDUCED NEED FOR GAPS WHEN HANDLING INTERFERENCE

(71) Applicant: Telefonaktiebolaget L M Ericsson, Stockholm (SE)

(72) Inventors: Iana Siomina, Solna (SE); Joakim Axmon, Kävlinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 247 days.

(21) Appl. No.: 14/159,685

(22) Filed: Jan. 21, 2014

(65) Prior Publication Data

US 2014/0204866 A1 Jul. 24, 2014

Related U.S. Application Data

(60) Provisional application No. 61/754,905, filed on Jan. 21, 2013.

(51) Int. Cl.
*H04W 28/04* (2009.01)
*H04L 5/00* (2006.01)
(Continued)

(52) U.S. Cl.
CPC ........ *H04W 28/048* (2013.01); *H04B 1/1027* (2013.01); *H04B 1/12* (2013.01);
(Continued)

(58) Field of Classification Search
None
See application file for complete search history.

(56) References Cited

U.S. PATENT DOCUMENTS

| | | | | |
|---|---|---|---|---|
| 2012/0122472 A1* | 5/2012 | Krishnamurthy | ..... | H04L 5/0053 455/456.1 |
| 2013/0044621 A1* | 2/2013 | Jung | ................... | H04W 72/082 370/252 |
| 2013/0201884 A1* | 8/2013 | Freda | ................. | H04W 72/005 370/278 |

FOREIGN PATENT DOCUMENTS

| | | |
|---|---|---|
| WO | WO 2011/103475 A1 | 8/2011 |
| WO | WO 2011/130451 A1 | 10/2011 |
| WO | WO 2012/177203 A1 | 12/2012 |

OTHER PUBLICATIONS

PCT Notification of Transmittal of the International Search Report and the Written Opinion of the International Searching Authority, or the Declaration, International Application No. PCT/IB2014/058448, 11 pages, dated Jun. 10, 2014.

* cited by examiner

*Primary Examiner* — Joshua Kading
(74) *Attorney, Agent, or Firm* — Baker Botts, LLP

(57) ABSTRACT

According to some embodiments, a radio node receives target channels from a target cell and interfering channels from first and second interfering cells. The first target channel and the first interfering channel each comprise a first channel type, and the second target channel and the second interfering channel each comprise a second channel type. The radio node receives the first interfering channel when receiving the first target channel and determines first information accordingly. The radio node uses one or more gaps impacting receipt of the second interfering channel relative to receipt of the second target channel and determines second information based on receipt of the second target channel and second interfering channel. The radio node reduces interference associated with the at least one of the (Continued)

interfering cell based on at least one of the first information and the second information.

21 Claims, 11 Drawing Sheets

(51) Int. Cl.
*H04L 25/03* (2006.01)
*H04B 1/10* (2006.01)
*H04B 1/12* (2006.01)
*H04W 72/08* (2009.01)
*H04J 11/00* (2006.01)

(52) U.S. Cl.
CPC ......... *H04J 11/005* (2013.01); *H04J 11/0056* (2013.01); *H04L 5/0073* (2013.01); *H04L 25/03821* (2013.01); *H04W 72/082* (2013.01)

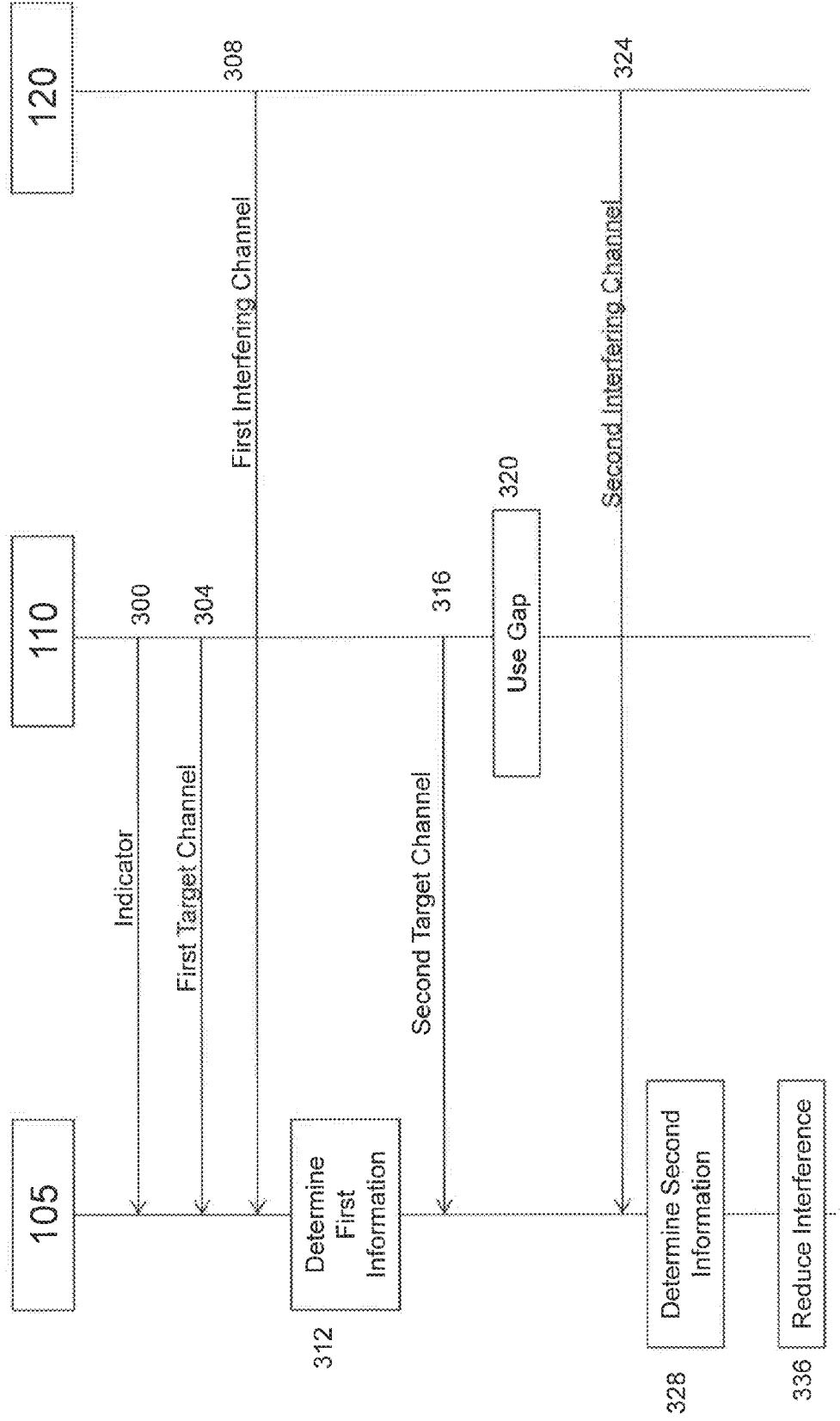

METHODS ENABLING ENHANCED RECEIVERS WITH A REDUCED NEED FOR GAPS WHEN HANDLING INTERFERENCE

RELATED APPLICATIONS

This application claims the benefit of priority of U.S. Provisional Patent Application No. 61/754,905 filed on Jan. 21, 2013.

TECHNICAL FIELD

Particular embodiments relate generally to wireless communication networks and more particularly to networks where enhanced receivers are used to handle interference.

BACKGROUND

In a wireless network, a wireless communication device may communicate with one or more radio network nodes to transmit and/or receive voice traffic, data traffic, control signals, and so on. Maintaining good signal quality between the wireless communication device and the radio network node may allow for good performance, such as high bitrate transmissions or robust control channel performance. However, it may be difficult to maintain good signal quality in complex radio environments. For example, interfering cells may create noise that interferes with the signal quality.

SUMMARY

According to some embodiments, a radio node receives target channels from a target cell and interfering channels from first and second interfering cells. The first target channel and the first interfering channel each comprise a first channel type, and the second target channel and the second interfering channel each comprise a second channel type. The radio node receives the first interfering channel when receiving the first target channel and determines first information accordingly. The radio node uses one or more gaps impacting receipt of the second interfering channel relative to receipt of the second target channel and determines second information based on receipt of the second target channel and second interfering channel. The radio node reduces interference associated with the at least one of the interfering cell based on at least one of the first information and the second information.

Some embodiments of the disclosure may provide one or more technical advantages. A technical advantage of certain embodiments may allow for handling interference with a reduced need for gaps. In some embodiments, system information (SI) may be read with reduced gaps. For example, SI may be read from certain channel types (e.g., PBCH) without gaps and SI may be read from other channel types (e.g., PDSCH) using gaps. Reducing the gaps may allow a radio node an opportunity to receive channels or signals from a victim cell and an aggressor cell at substantially the same time. Receiving the channels or signals at substantially the same time may facilitate mitigating interference using enhanced receiver techniques. In some embodiments, some gaps may continue to be used for other channels or signals in order to avoid the complexity (e.g., memory and processing requirements) associated with receiving those channels or signals from a victim cell and an aggressor cell at substantially the same time. In some embodiments, it may be possible to meet the existing intra-frequency SI reading requirement (e.g., 150 ms) while using gaps for SIB1 and handling high interference.

Some embodiments may benefit from some, none, or all of these advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which:

FIG. 3 is a signaling diagram illustrating an exchange of signals in an embodiment of a network;

DETAILED DESCRIPTION

In a wireless network, a wireless communication device may communicate with one or more radio network nodes to transmit and/or receive voice traffic, data traffic, control signals, and so on. Maintaining good signal quality between the wireless communication device and the radio network node may allow for good performance, such as high bitrate transmissions or robust control channel performance. However, it may be difficult to maintain good signal quality in complex radio environments. For example, interfering cells may create noise that interferes with the signal quality. Embodiments of the present disclosure may facilitate reducing interference associated with an interfering cell. Particular embodiments are described in FIGS. 1-7 of the drawings, like numerals being used for like and corresponding parts of the various drawings.

Figure 1:
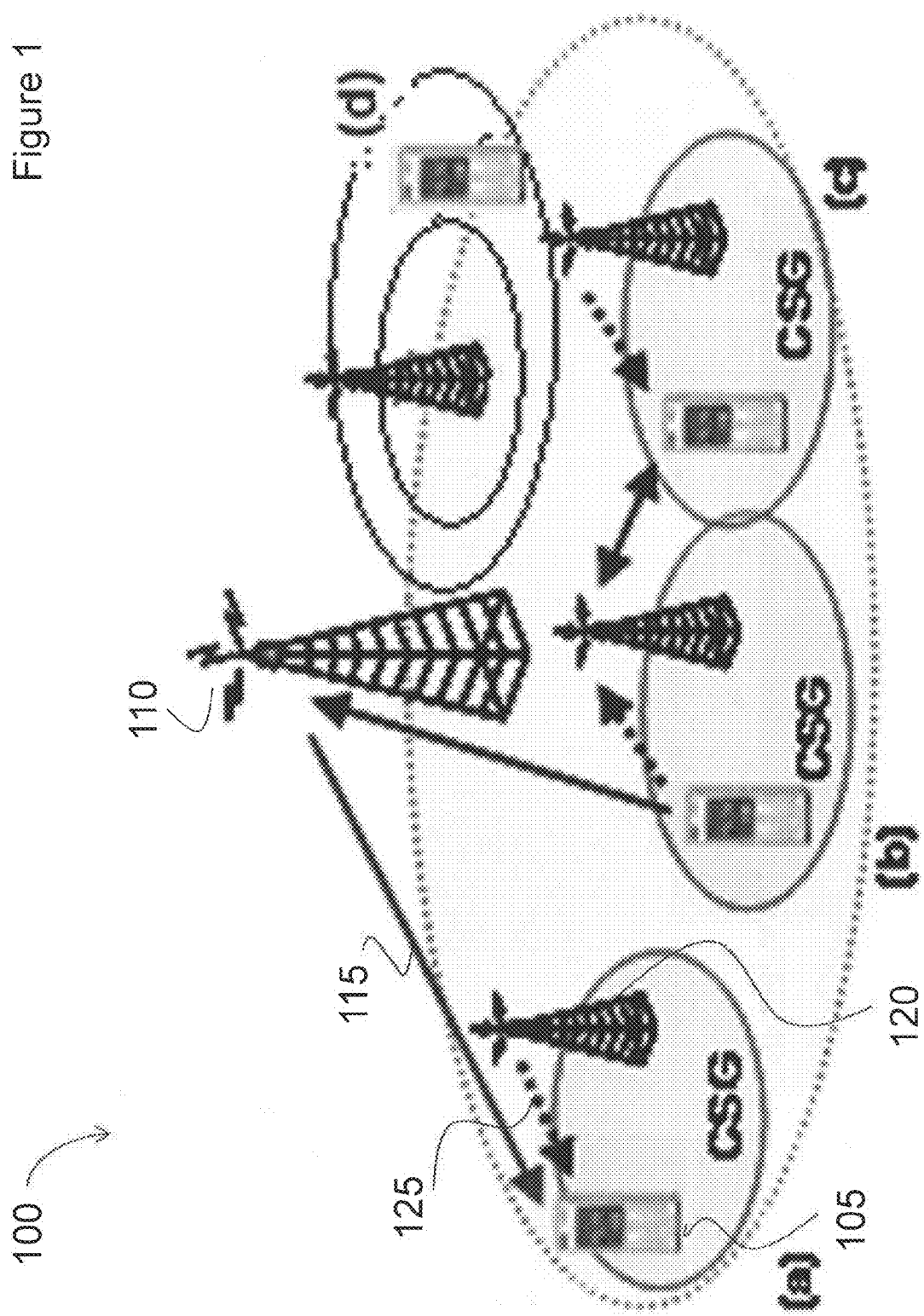
FIG. 1 is a block diagram illustrating an embodiment of a network.

FIG. 1 is a block diagram illustrating embodiments of a network 100 comprising a radio node 105, a target cell 110, and an interfering cell 120. Radio node 105 may comprise user equipment/UE (such as a laptop, mobile telephone, or tablet device) or a radio network node (such as a femto base station, home base station, or eNodeB) and may receive a target signal 115 from target cell 110. Target cell 110 may be a serving cell or another cell of interest to radio node 105, and target signal 115 may comprise voice traffic, data traffic, control signals, and/or any other suitable information communicated between radio node 105 and target cell 110. Radio node 105 may be impacted by an interfering signal 125 from interfering cell 120. Interfering signal 125 may interfere with radio node 105's ability to receive target signal 115 clearly, which may cause performance problems like lower bitrate transmissions between radio node 105 and target cell 110. Interfering signal 125 may tend to be stronger/cause greater interference when radio node 105 is located near interfering cell 120.

Target cell 110/target signal 115 and interfering cell 120/interfering signal 125 may be referred to as a victim and an aggressor, respectively. The term "victim" may apply, for example, to a measured signal or a measured cell (depending on the context) being measured in high-interference conditions. The term "aggressor" may apply, for example, to a strongly interfering signal/channel or a strongly interfering radio node (e.g., a wireless device or a radio network node) or antenna or a cell (depending on the context), which interferes with the victim signal/channel/node/antenna/cell. In a cellular network, the interference may be due to intra-cell, inter-cell, or device-to-device communication. The aggressor signal may be transmitted by the same node or a different node than that transmitting the victim signal (e.g., a cell of the same eNodeB or a cell of a different eNodeB; an intra-cell interfering signal can be transmitted in the same cell by a different UE or by the same eNodeB using a different signal characteristic). Some examples of victim-aggressor relations: an LTE physical signal to an LTE physical signal (of the same or different type) or to an LTE physical channel, an LTE physical channel to an LTE physical channel (of the same or different type) or an LTE physical signal, a macro cell or its UE interfering with a pico cell or the pico UE, a femto cell or a CSG UE interfering with a non-CSG cell or non-CSG UE, etc.

Radio node 105 may be configured to reduce interference associated with interfering signal 125. For example, radio node 105 may comprise an enhanced receiver that may improve performance by fully or partly eliminating the interference arising from at least one interfering source, such as interfering cell 120. However, enhanced receiver techniques may add complexity, for example, by requiring more processing power and/or more memory. Thus, in certain embodiments, radio node 105 may use enhanced receiver techniques to receive specific signals or channels (e.g., for inference mitigation) and may not use enhanced receiver techniques to receive other signals or channels (e.g., to make efficient use resources). For example, radio node 105 may apply an interference mitigation or cancellation technique only on a data channel. In another example, a relatively more sophisticated radio node 105 may apply interference mitigation on the data channel and one or two common control signals, such as a reference signal, a synchronization signal, or other common control signal. Additional examples are described in more detail with respect to FIG. 3 below.

Examples of an enhanced receiver include an interference mitigation receiver, an interference cancellation receiver, an interference suppression receiver, an interference rejection receiver, an interference aware receiver, an interference avoidance receiver, an advanced receiver, and any receiver implementing any of the embodiments described herein or implementing a receiver interference handling technique, such as interference cancellation, interference suppression, interference rejection, etc. Herein, the generic term 'enhanced receiver' may refer to any of the preceding receivers and the term 'enhanced receiver technique' may refer to any interference handling techniques used by the preceding receivers (e.g., interference cancellation, interference suppression, puncturing or interference rejection combining). In some embodiments, "receiver type" may be used interchangeably with "receiver technique."

In some embodiments, radio node 105 may comprise an enhanced receiver specified by Universal Mobile Telecommunications System (UMTS)/High-Speed Downlink Packet Access (HSDPA). An enhanced receiver may be 'enhanced' in comparison to the baseline UMTS/HSDPA receiver (e.g., a rake receiver). Examples of enhanced receivers in UMTS/HSDPA include an enhanced receiver type 1 (with two-branch receiver diversity), an enhanced receiver type 2 (with single-branch equalizer), an enhanced receiver type 3 (with two branch receiver diversity and equalizer), and an enhanced receiver type 3i (with two branch receiver diversity and inter-cell interference cancellation capability). The enhanced receivers can be used to improve performance, e.g., in terms of throughput and/or coverage.

LTE Rel-10 and LTE Rel-11 may further describe technique that may be performed by an enhanced receiver in order to reduce interference. In LTE Rel-10, enhanced interference coordination techniques may mitigate potentially high interference, e.g., in a cell range expansion zone, while providing the UE with time-domain measurement restriction information. In LTE Rel-11, advanced receivers based on Minimum Mean Square Error—Interference Rejection Combining (MMSE-IRC) with several covariance estimation techniques and interference-cancellation-capable receivers (for different types of signals and channels) have been studied. In the future, enhanced receivers may support additional complexity, such as Minimum Mean Square Error—Successive Interference Cancellation (MMSE-SIC) for performing nonlinear subtractive-type interference cancellation.

An enhanced receiver may mitigate one or more types of interference, such as co-channel (intra-frequency) interference, inter-frequency interference, or inter-radio access technology interference (e.g., when the bandwidth associated with interfering signal 125 overlaps the bandwidth associated with a target cell). As an example, in intra-frequency measurements, the enhanced receiver may measure a target cell while radio node 105 is currently being served by target cell 110 (or multiple target cells in carrier aggregation: one primary cell (PCell) and one or more secondary cells (SCells)). The transmissions in the current and target cells may be any one or more of: downlink (DL), uplink (UL), or device-to-device transmissions. For example, in a time division duplex (TDD) band, downlink and uplink may occur on the same frequency in some configurations. Earlier LTE releases, have assumed that TDD cells synchronize the UL/DL, configuration. However, it may become possible to use different UL/DL configurations in different cells (e.g., with dynamic TDD under study in 3GPP). This may imply the possibility of a scenario when the DL is transmitted in one cell while the UL is transmitted in another cell at the same time. Similarly, device-to-device transmission may occur in parallel to another device-to-device transmission or another DL or UL transmission.

Enhanced receiver techniques may benefit various interference-prone deployments, including homogenous deployments, heterogeneous deployments, and mixed deployments. Homogeneous deployments may generally describe deployments comprising the same (or similar) type of radio network nodes and/or similar coverage and cell sizes and inter-site distances. Heterogeneous deployments may generally describe deployments using a variety of types of radio network nodes and/or coverage and cell sizes and inter-site distances. Mixed deployments may comprise a mix of homogenous portions and heterogeneous portions.

FIG. 1 illustrates an example of a heterogeneous deployment in which low-power nodes, such as interfering cell 120 in the illustration, are placed throughout a macro-cell layout (e.g., the macro-cell layout includes target cell 110 in the embodiment illustrated in FIG. 1). The various nodes may use different transmit powers and may have different cell sizes, different capacities, etc. Deploying low-power nodes throughout a macro-cell layout may extend capacity in certain traffic hotspots (e.g., small geographical areas with a relatively high user density and/or high traffic intensity). Heterogeneous deployments may also be viewed as a way of densifying networks to adopt for the traffic needs and the environment. Thus, heterogeneous deployments tend to be more and more prevalent as the interest in deploying low-power nodes (such as pico base stations, home eNodeBs, relays, remote radio heads, etc.) to enhance network coverage, capacity, and service experience of individual users in the macro network has increased.

In a heterogeneous deployment, differences between the different types of nodes, such as differences in transmit power, may tend to increase the complexity of managing interference in the uplink and/or in the downlink (as compared to a homogenous deployment). In FIG. 1, area (a) illustrates radio node 105 being impacted by interference signal 125 from a low power node (interfering cell 120) when receiving target signal 115 from a macro cell (target cell 110). Area (b) illustrates a radio node sending a signal to macro cell 110 that causes interference towards the home eNodeB associated with a Closed Subscriber Group (CSG). Area (c) illustrates a CSG user in area (c) being impacted by interference from the home eNodeB associated with area (b) while trying to communicate with the home eNodeB associated with area (c). Area (d) illustrates a radio node served by a pico cell in the expended cell range area. A radio network node can be characterized as both a target cell (e.g., with respect to one UE) and an interfering cell (e.g., with respect to another UE). For example, although cell 110 acts as a target cell for radio node 105, cell 110 may create interference for the UE located in area (c) and in communication with a home eNodeB. Although FIG. 1 illustrates several CSG cells, in other embodiments a heterogeneous deployment does not necessarily include CSG cells.

Interference handling in heterogeneous deployments may allow for good signal quality in the downlink in order to provide reliable and high-bitrate transmissions as well as robust control channel performance. The signal quality may be determined by the received signal strength and its relation to the total interference and noise received by the receiver. A good network plan, which may include cell planning and other static radio resource management, may provide a starting point for minimizing interference. In addition, semi-static and dynamic radio resource management mechanisms may facilitate interference management. Deploying more advanced antenna technologies and algorithms may provide yet another mechanism for mitigating interference.

One way to handle interference is, for example, to adopt more advanced transceiver technologies, such as interference cancellation mechanisms in terminals (e.g., wireless devices, UEs). Another way, which can be complementary to the former, may be to design efficient interference coordination algorithms and transmission schemes in the network. The coordination may be realized in static, semi-static or dynamic fashion. Static or semi-static schemes may rely on reserving time-frequency resources (e.g., a part of the bandwidth and/or time instances) that are orthogonal for strongly interfering transmissions. Dynamic coordination may be implemented, for example, by means of scheduling. Such interference coordination may be implemented for all or specific channels (e.g., data channels or control channels) or signals.

Specifically for heterogeneous deployments, there have been standardized enhanced inter-cell interference coordination (eICIC) mechanisms for ensuring that the UE performs at least some measurements (e.g., RRM, RLM and CSI measurements) in low-interference subframes of the interfering cell. These mechanisms involve configuring patterns of low-interference subframes at transmitting nodes (and thereby reducing interference) and configuring measurement patterns for UEs (and thereby indicating to the UEs low-interference measurement occasion). Two types of patterns have been defined for eICIC in LTE Rel-10 to enable restricted measurements in the downlink. First, restricted measurement patterns, which are configured by a network node and signaled to the UE. Second, transmission patterns (a.k.a. Almost Blank Subframe, ABS, patterns), which are configured by a network node, describe the transmission activity of a radio node, and may be exchanged between the radio nodes. In some embodiments, subframe may refer to an example resource in the time domain, such as any pre-defined time instance or time period.

With respect the first type of patterns, to enable restricted measurements for RRM (e.g., RSRP/RSRQ), RLM, CSI as well as for demodulation, the UE may receive via RRC UE-specific signaling the following set of patterns according to TS 36.331 v10.1.0. Pattern 1 uses single RRM RLM measurement resource restriction for the serving cell. Pattern 2 uses one RRM measurement resource restriction for neighbor cells (up to 32 cells) per frequency (currently only for the serving frequency). Pattern 3 uses resource restriction for CSI measurement of the serving cell with 2 subframe subsets configured per UE. A pattern may comprise a bit string indicating restricted and unrestricted subframes characterized by a length and periodicity, which are different for FDD and TDD (40 subframes for FDD and 20, 60 or 70 subframes for TDD). Restricted measurement subframes are configured to allow the UE to perform measurements in subframes with improved interference conditions, which may be implemented by configuring Almost Blank Subframe (ABS) patterns at eNodeBs.

In addition to RRM/RLM, Pattern 1 may also be used to enable UE Rx-Tx measurements in low-interference conditions or in principle for any CRS-based measurement to improve the measurement performance when the strong interference may be reduced by configuring low-interference subframes. Pattern 3 may be used for enhancing channel quality reporting, and improving the performance of channel demodulation and decoding (e.g., of data channels such as PDSCH, control channels such as PDCCH, PCFICH, PHICH). Pattern 1 and Pattern 2 may also be used for enabling low-interference conditions for common signals (e.g., PSS/SSS), common channels, and broadcast/multicast channels (e.g., PBCH), when the strong interference can be reduced or avoided (e.g., when a time shift is applied to ensure that the common channels/signals are interfered by data whose interference may be avoided by configuring low-interference subframes and hereby suppressing the interfering data transmissions).

With respect the second type of patterns, for example, an ABS pattern indicates subframes when the eNodeB restricts its transmissions (e.g., does not schedule or transmits at a lower power). The subframes with restricted transmissions are referred to as ABS subframes. In the current standard, eNodeBs can suppress data transmissions in ABS subframes but the ABS subframes cannot be fully blank—at least some of the control channels and physical signals are still transmitted. Examples of control channels that are transmitted in ABS subframes even when no data is transmitted are PBCH and PHICH. Examples of physical signals that have to be transmitted, regardless of whether the subframes are ABS or not, are cell-specific reference signals (CRS) and synchronization signals (PSS and SSS). Positioning reference signals (PRS) may also be transmitted in ABS subframes.

If an MBSFN subframe coincides with an ABS, the subframe is also considered as ABS according to TS 36.423. CRS are not transmitted in MBSFN subframes, except for the first symbol, which allows for avoiding CRS interference from an aggressor cell to the data region of a measured cell. ABS patterns may be exchanged between eNodeBs, e.g., via X2, without signaling these patterns to the UE.

In LTE Rel-11, for enhanced receivers (e.g., capable of interference cancellation), information about a strongly interfering cell (also referred to as an aggressor cell) may be provided to facilitate handling the strong interference generated by transmissions in that cell. For example, the UE may be provided with PCI, number of CRS antenna ports, MBSFN subframe configuration, or other suitable information about the interfering cell in order to handle the interference.

In FIG. 1, radio node 105 may be characterized by its ability to transmit and/or receive radio signals and it may comprise at least a transmitting or receiving antenna. Radio node 105 may be a wireless device (e.g., user equipment) or a radio network node as further described below. Thus, as used herein, references to wireless devices, user equipment, and radio network nodes may refer to various embodiments of radio node 105.

A wireless device may be an embodiment of a radio node 105 equipped with a radio interface and capable of at least transmitting or receiving a radio signal from another radio node 105. In some embodiments, the wireless device may also be capable of demodulating a signal. Examples of wireless devices include user equipment (UE), such as personal digital assistants (PDAs), laptops, mobiles telephones, tablet devices, sensor devices, and sensors. Other examples of wireless devices may include machine-to-machine (M2M)/machine type communication (MTC) devices that have limited communication capabilities, such as a wireless meter or other sensor, a digital billboard, a wireless-capable appliance (e.g., a washing machine or a digital video recorder (DVR)), a radiofrequency identifier (RFID) tag, or any other device capable of wireless communication with a radio communications network. The contents of an example wireless device are described in greater detail below with respect to FIG. 6.

A radio network node may refer to a radio node 105 comprised in a radio communications network. A radio network node may be capable of receiving radio signals or transmitting radio signals in one or more frequencies, and may operate in single-radio access technology, multi-radio access technology, or multi-standard mode (e.g., MSR). Examples of radio network nodes may include femto base stations, home base stations, eNodeBs, small radio base stations, remote radio heads (RRHs), remote radio frequency unit (RRU), fixed relays, mobile relays, transmit-only radio network nodes, receive-only radio network nodes, and/or other radio network nodes (which may be equipped with a UE-like interface in some embodiments).

Figure 7:
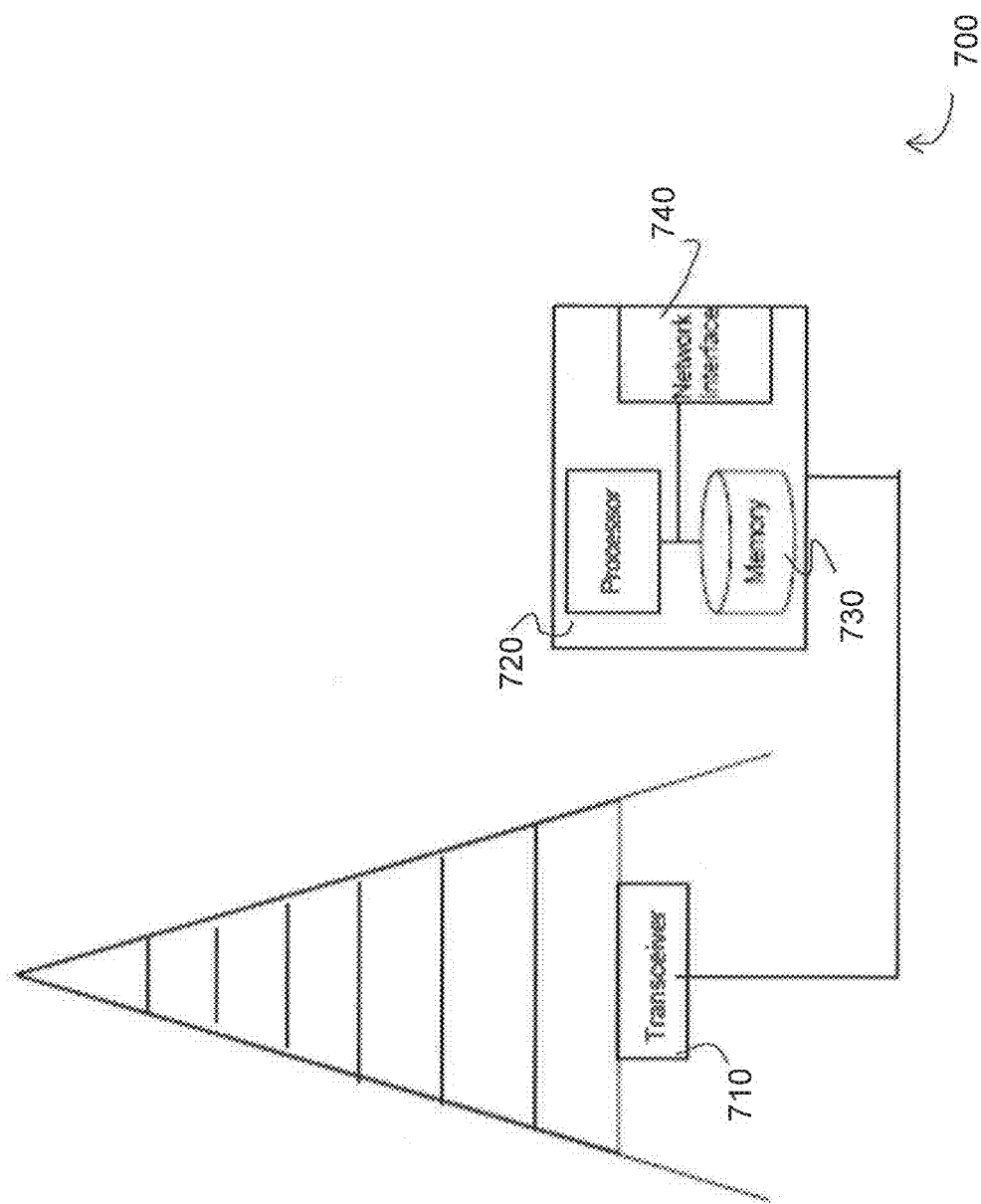
FIG. 7 is a block diagram illustrating embodiments of a network node.

Each radio network node may or may not create its own cell. Some examples of radio network nodes not creating their own cells are beacon devices that transmit configured radio signals, measuring nodes that receive and perform measurements on certain signals (e.g., location management units/LMUs), nodes that share a cell or cell ID with another radio node that creates a cell. The radio network node may operate in a cell sector or may be associated with a radio network node creating own cell. More than one cell (which may be understood as a cell or a logical or geographical part of a cell, such as a cell sector or a virtual cell) may be associated with one radio network node. Further, one or more serving cells (in the downlink (DL) and/or uplink (UL)) may be configured for a UE. For example, in a carrier aggregation system a UE may have one Primary Cell (PCell) and one or more Secondary Cells (SCells). A cell may also be a virtual cell (which may be characterized by a cell ID but might not provide a full cell-like service) associated with a transmit node. FIG. 7 below provides one example of components that may be used in a radio network node.

Radio network node may be both a radio node and a network node. A network node may be any radio network node (described above) or a core network node. Some non-limiting examples of a network node are an eNodeB (also radio network node), RNC, positioning node, MME, PSAP, SON node, MDT node, coordinating node, a gateway node (e.g., P-GW or S-GW or LMU gateway or femto gateway), and O&M node. A coordinating node may refer to a network and/or node that coordinates radio resources with one or more radio nodes. Some examples of the coordinating node are network monitoring and configuration node, OSS node, O&M, MDT node, SON node, positioning node, MME, a gateway node such as Packet Data Network Gateway (P-GW) or Serving Gateway (S-GW) network node or femto gateway node, a macro node coordinating smaller radio nodes associated with it, eNodeB coordinating resources with other eNodeBs, etc.

In network 100, signaling may be via direct links or via logical links (e.g., via higher layer protocols and/or via one or more network and/or radio nodes) or other indirect links. For example, signaling from a coordinating node to a UE may also pass another network node, e.g., a radio network node.

Figure 2A:
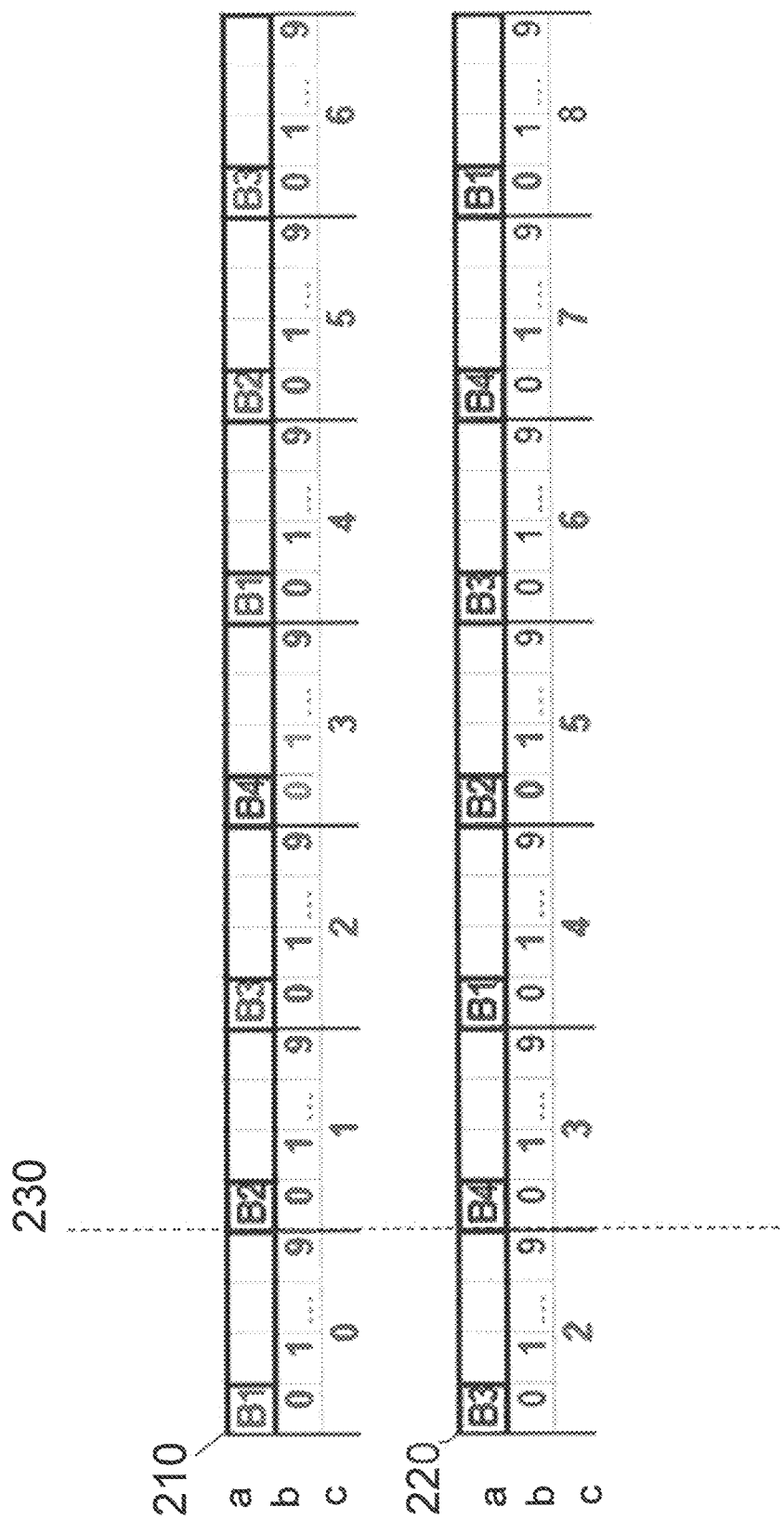
FIGS. 2a-2b are diagrams illustrating embodiments of channels received from a target cell and an interfering cell.
Figure 2B:
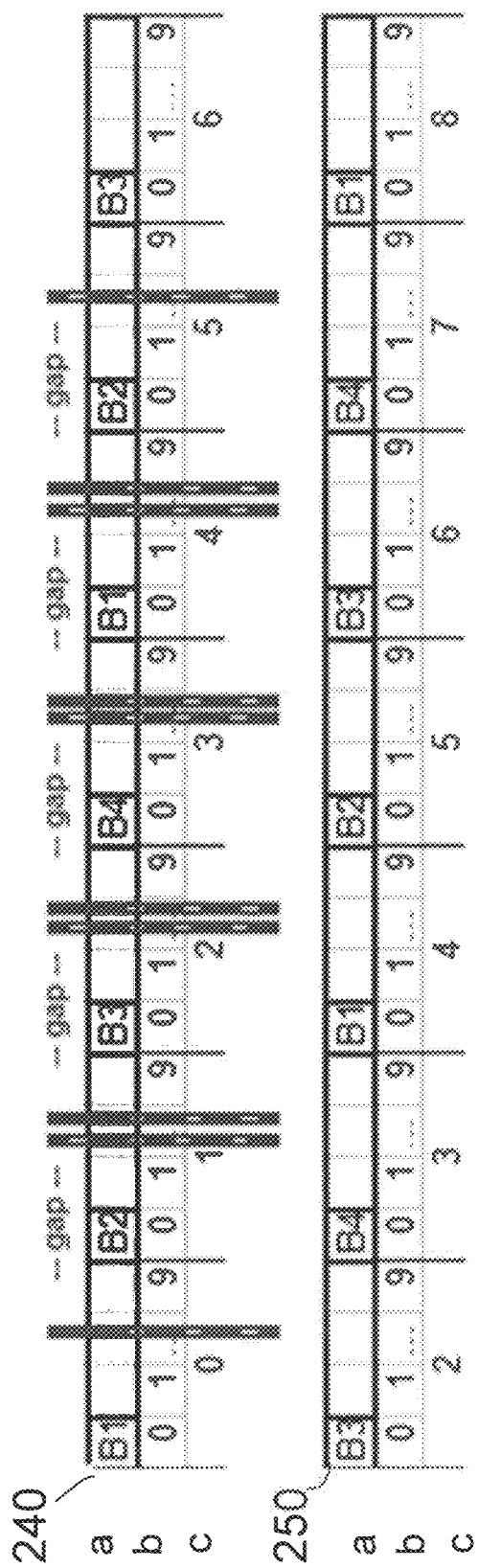

FIGS. 2a-2b are diagrams illustrating embodiments of channels received from a target cell and an interfering cell. In some embodiments, radio node 105 may receive a physical broadcast channel (PBCH) and a physical downlink shared channel (PDSCH). In some embodiments, radio node 105 may read certain system information (SI), such as master information block (MIB), from the PBCH and other SI, such as one or more system information blocks (SIBs) from the PDSCH. In high-interference scenarios, it may be challenging to read the SI. Accordingly some radio nodes 105 (e.g., UEs) may comprise an enhanced receiver capable of acquiring the PBCH while cancelling interference from an interfering/aggressor cell. For example, radio-frame alignment may be used for PBCH/MIB interference cancellation. MIB interference cancellation may or may not involve MIB decoding. FIG. 2a illustrates an example in which two cells receive physical broadcast channel (PBCH) transmissions with aligned radio frame boundaries.

In FIG. 2a, channel 210 may correspond to a PBCH received from a target cell and channel 220 may correspond to a PBCH received from an interfering cell. With respect to the target cell, row 210a may illustrate MIB subframes, row 210b may illustrate the subframe number, row 210c may illustrate the radio frame number. With respect to the interfering cell, row 220a may illustrate MIB subframes, row 220b may illustrate the subframe number, row 220c may illustrate the radio frame number. In some embodiments, the MIB is mapped on the BCCH and carried on BCH while all other SI messages are mapped on the BCCH and dynamically carried on DL-SCH where they can be identified through the SI-RNTI (System Information RNTI).

In the illustration, the MIB is transmitted according to a fixed schedule with a periodicity of 40 ms in subframes #0 (see box B1). To improve MIB detection performance, the FIGURE illustrates three redundancy versions signaled with a 10 ms period (see boxes B2, B3, and B4). Boundary line 230 illustrates that the frame boundary between radio frame 0 and radio frame 1 for the target cell aligns with the frame boundary between radio frame 2 and radio frame 3 of the interfering cell. As can be seen, the frame boundaries between the subsequent frames are also aligned. The alignment of the frame boundaries may allow radio node 105 to receive the target cell PBCH and the interfering cell PBCH simultaneously in order to cancel the interference using an enhanced receiver technique.

Turning to the PDSCH, the SIB1 may be transmitted with a periodicity of 80 ms and repetitions made within 80 ms. The first transmission of SystemInformationBlockType1 may be scheduled in subframe #5 of radio frames for which the SFN mod 8=0, and repetitions may be scheduled in subframe #5 of all other radio frames for which SFN mod 2=0, i.e., with 20 ms period. The scheduling of other SI messages (e.g., periodicity and SI-window) is flexible and indicated by SystemInformationBlockType. In some embodiments, each SIB may be contained only in a single SI message and only SIBs having the same scheduling requirement (periodicity) can be mapped to the same SI message. There may also be a limit on the maximum size of a SI message (e.g., 217 bytes with DCI format 1C and 277 bytes with 1a format). The UE may store the received SI for a period of time, such as three hours, and may determine that the SI has become invalid after the period of time has elapsed. If system information changes, the Paging message may be used to inform UEs in RRC_IDLE and UEs in RRC_CONNECTED.

System information may also be provided to the UE by means of dedicated signaling, for example, upon handover. Furthermore, to facilitate receiver performance in high-interference conditions, according to TS 36.300, the network may provide SIB1 to the UE in the CRE region by a dedicated RRC signaling to assist UE system information acquisition. According to TS 36.331, in addition to system information broadcast, the E-UTRAN may provide the same SystemInformationBlockType1 via dedicated signaling in the RRCConnectionReconfiguration message.

The UE may be allowed to create autonomous gaps for intra-frequency, inter-frequency, or inter-RAT CGI/SI reading as described further below. The target cell whose CGI can be acquired can be intra-frequency cell, inter-frequency cell or even inter-RAT cell (e.g. UTRAN, GERAN, CDMA2000 or HRPD). The serving cell may request the UE to report the CGI of the target cell in various scenarios, such as verification of a CSG cell, establishment of SON ANR, or MDT.

In addition to the MIB and SIB information, the SI may contain other information such as system frame number (SFN). SFN may be acquired for many purposes such as for positioning when the SFN of the reference cell is not known (e.g., inter-frequency RSTD measurements when the reference cell and the neighbor cells in the assistance data are not on the serving cell frequency).

LTE may require the UE to report an intra-frequency ECGI within about 150 ms from when a target intra-frequency cell provided its SINR at a certain level or higher. Meeting or exceeding the SINR level may indicate that the UE is allowed to create autonomous gaps in the downlink and uplink. The UE may be required to transmit a certain number of ACKs/NACKs on the uplink to ensure that the UE does not create excessive gaps.

In UTRAN, the target cell's CGI acquisition time may be relatively long, for example, more than 1 second depending upon the periodicity of the SIB3, which contains the CGI. Furthermore due to the autonomous gaps created by the UE to acquire the target cell's CGI, the interruption of the data transmission and reception from the serving cell can be 600 ms or longer.

In E-UTRAN the serving cell can request the UE to acquire the cell global identifier (CGI), which uniquely identifies a cell, of the target cell. In order to acquire the CGI of the target cell, the UE may read at least part of the system information (SI) including the master information block (MIB) and the relevant system information block (SIB) as described later. The reading of SI for the acquisition of CGI may be carried out during measurement gaps which are autonomously created by the UE.

In LTE the UE may read the MIB and SIB1 of the target cell E-UTRAN cell to acquire its CGI (aka ECGI when the target cell is E-UTRAN intra- or inter-frequency). In LTE the MIB may be transmitted on the BCH and may include a limited number of the most essential and most frequently transmitted parameters that are needed to acquire other information from the cell, for example, DL bandwidth, PHICH configuration, and system frame number (SFN).

The LTE SIB1, as well as other SIB messages, may be transmitted on the DL-SCH. In LTE the SIB1 may contains, for example, PLMN identity, Cell identity, CSG identity and indication, Frequency band indicator, SI-window length, Scheduling info for other SIBs. The LTE SIB1 may also indicate whether a change has occurred in the SI messages. The UE is notified about coming change in the SI by a paging message, from which it will know that the system information will change at the next modification period boundary. The modification period boundaries may be defined by SFN values for which SFN mod m=0, where m is the number of radio frames comprising the modification period. The modification period can be configured by system information.

In the case of inter-RAT UTRAN, the UE may read the MIB and SIB3 of the target cell UTRAN cell to acquire its CGI.

The following timer may be used when a CGI report is requested:

| Timer | Start | Stop | Expiry |
|-------|-------|------|--------|
| T321 | Upon receiving measConfig including a reportConfig with the purpose set to reportCGI | Upon acquiring the information needed to set all fields of cellGlobalId for the requested cell, upon receiving measConfig that includes removal of the reportConfig with the purpose set to reportCGI | Initiate the measurement reporting procedure, stop performing the related measurements and remove the corresponding measId |

The timer may be set differently when autonomous gaps are used.

With the current standard, when a UE configures gaps (e.g., autonomous gaps for performing intra-frequency measurements), it is not straightforward how an enhanced receiver should be used, particularly when the enhanced receiver functionality involves simultaneous measurements. In the presence of higher interference, it may be desirable to estimate the interference at the time that it needs to be mitigated. Simultaneous channel reception may allow for estimating the interference at the time that it needs to be mitigated, but simultaneous channel reception may add complexity (e.g., more memory and extra processing may be required). Additional complexity may also be required to handle interference from a physical channel with an unknown payload, which may involve decoding, as compared to handling interference from a known physical signal (e.g., CRS). Complexity may increase if there are multiple aggressor cells, for example, if the UE has to read one victim cell and 2 aggressor cells at the same time.

UEs may use gaps to reduce the complexity. However, UEs using gaps for reading another-cell channel, even on the same frequency, may not be able to measure a victim channel while reading the aggressor channel. Therefore, UEs using gaps may not be able to cancel the interference (or apply at least some enhanced receiver techniques) at the same time instance. Victim channels/signals may be of the same type (see e.g. FIG. 4, where aggressor PBCH interferes with the victim PBCH due to aligned boundaries of radio frames of the two cells) or of different type (e.g., when the network has shifted radio frames to avoid PBCH-to-PBCH interference, the aggressor PBCH may interfere victim PDSCH). The example below is provided for PBCH, but the problem is not limited to PBCH only.

FIG. 2b illustrates an example of a PBCH transmission in victim and aggressor cells with autonomous gaps used for MIB reading of Cell 1 (e.g., the aggressor cell). During the gaps, the UE may not be able to read the MIB from Cell 2 (e.g., the victim cell). For the purposes of this description, "autonomous gaps" may be one or more of: intra-frequency autonomous gaps, inter-frequency autonomous gaps, inter-RAT autonomous gaps, or inter-band autonomous gaps (e.g., when the transmission of the aggressor signal/channel overlaps with the measurement/channel reception bandwidth, which may or may not be an intra-frequency scenario, e.g., depending on whether the center frequencies are aligned or not).

In FIG. 2B, channel 250 may correspond to a PBCH received from a target cell/victim cell and channel 240 may correspond to a PBCH received from an interfering cell/aggressor cell. With respect to the target cell, row 250a may illustrate MIB subframes, row 250b may illustrate the subframe number, row 250c may illustrate the radio frame number. With respect to the interfering cell, row 240a may illustrate MIB subframes, row 240b may illustrate the subframe number, row 240c may illustrate the radio frame number.

Known enhanced receiver techniques (which may perform interference cancellation when receiving an aggressor channel and a victim channel simultaneously) may not work properly in conjunction with autonomous gaps (during which the receiver may receive the aggressor channel and not receive the victim channel). The network may request measurements or reports (e.g., CGI reading and reporting) while enhanced receiver is used, and according to the current standard the UE is allowed to use autonomous gaps for the requested CGI reading, which means that performance may be degraded during that time. The network may not aware when a UE is configuring autonomous gaps and cannot perform measurements on the victim cell (neither transmit in UL) and may schedule victim transmissions, which may result in performance degradation, e.g., due to inability of simultaneous channel reception at the UE. An interfering channel may cause interference to signals or channels that do not need to be read so often, e.g., to PBCH of a victim cell, but in some cases an interfering channel may cause interference to channels that need to be read always (e.g., data channels) or relatively often (e.g., some broadcast data which changes relatively frequently).

Particular embodiments may provide solutions to these and other problems. For example, some embodiments may allow for reduced or partial gaps for parallel channel readings. Some embodiments may adapt channel acquisition with reduced gap usage. Some embodiments may comply with pre-defined rules and meet pre-defined requirements.

FIG. 3 is a signaling diagram illustrating an exchange of signals in an embodiment of a network. At step 300, a radio network node (such as target cell 110) communicates an indicator to a radio node 105. The indicator instructs radio node 105 to receive a first channel type without using gaps and to receive a second channel type using one or more gaps. As an example, the indicator may instruct radio node 105 to receive the PBCH without using gaps and to receive the PDSCH using one or more gaps. The gaps may impact the receipt of an interfering channel relative to the receipt of a target channel. As an example, during the gaps, radio node 105 may receive the interfering channel and may not receive the target channel. When radio node 105 is configured to receive the PBCH without using gaps, radio node 105 may receive the target PBCH and the interfering PBCH at substantially the same. This may allow radio node 105 to perform enhanced receiver techniques for fully or partly eliminating interference from the interfering PBCH. When radio node 105 is configured to receive the PDSCH using gaps, radio node 105 may receive the interfering channel (but not the target channel) during the gaps. Using gaps may reduce complexity and/or reduce the amount of resources (e.g., memory, processing power) that radio node 105 uses to receive the PDSCH.

The indicator communicated in step 300 may comprise receiver characteristics such that radio node 105 is instructed to use the indicated configuration only if it supports the receiver characteristics. As an example, the receiver characteristics may provide for configuring radio nodes 105 having enhanced receivers (or certain types of enhanced receivers) to reduce the usage of gaps (e.g., by not using gaps to receive the PBCH) while radio nodes 105 having basic receivers may continue to use gaps. The indicator may also indicate whether it applies to intra-frequency cells, intra-Radio Access technology cells, or intra-band cells. Although FIG. 3 provides an example where radio node 105 receives instructions for configuring the use of gaps from the network, in other embodiments radio node 105 may determine when/whether to use gaps itself (without requiring the network to send the indicator). As an example, in some embodiments, radio node 105 may store a default configuration or a policy for determining how to configure gaps.

At step 304, radio node 105 (such as a wireless device comprising an enhanced receiver) may receive a first target channel from a target cell 110. Target cell 110 may be a serving cell for radio node 105 or another cell (non-serving cell) of interest to radio node 105. The first target channel may comprise a first channel type. As an example, the first channel type may be the Physical Broadcast Channel (PBCH). However, in other embodiments, any other suitable channel type may be used as the first channel type.

Radio node 105 receives a first interfering channel from a first interfering cell 120 at step 304. The first interfering channel may comprise the first channel type (e.g., the same channel type as the first target channel). Continuing with the example above, the first channel type could be a PBCH type. In some embodiments, the first channel type may be received without the use of gaps. Thus, the first interfering channel may be received when receiving the first target channel. In some embodiments, radio node 105 receives the first target channel (e.g., target PBCH) and the first interfering channel (e.g., interfering PBCH) at substantially the same time.

At step 312, radio node 105 determines first information based on receiving the first target channel and the first interfering channel. As an example, a radio node 105 receiving the target PBCH and interfering PBCH may determine first information comprising Master Information Block (MIB) information.

Radio node 105 receives a second target channel from target cell 110 at step 316. The second target channel comprises a second channel type. As an example, the second channel type may be the Physical Downlink Shared Channel (PDSCH). However, in other embodiments, any other suitable channel type may be used as the second channel type.

At step 320, radio node 105 uses gaps in order to facilitate receipt of a second interfering channel at step 324. The second interfering channel may be received from a second interfering cell. The second interfering cell can be the same as the first interfering cell (as illustrated in FIG. 3, where interfering cell 120 is both the first and second interfering cell). In the alternative, the second interfering cell can be different than the first interfering cell. The second interfering channel comprises the second channel type (e.g., the same channel type as the second target channel). Continuing with the example above, the second channel type could be a PDSCH type. The one or more gaps may comprise autonomous gaps (such as gaps configured by radio node 105) or measurement gaps (such as gaps configured by a network node in a message received by radio node 105). Using gaps may impact receipt of the second interfering channel relative to receipt of the second target channel. As an example, during the gaps, radio node 105 may receive the interfering channel (interfering PDSCH) and may not receive the target channel (target PDSCH).

At step 328, radio node 105 determines second information based on receiving the second target channel and the second interfering channel. As an example, a radio node 105 receiving the target PDSCH and interfering PDSCH may determine second information comprising System Information Block (SIB) information.

In some embodiments, radio node 105 may use early reading of the second channel type (e.g., early SIB1 reading from the PDSCH) and/or sparse reading of the second channel type (e.g., sparse SIB1 reading from the PDSCH) to facilitate receiving the first channel type without gaps and/or the second channel type with (potentially reduced) gaps. As an example, in early reading of the second channel type, radio node may receive first channel data from the first channel type (e.g., receive MIB Information from the PBCH), receive second channel data from the second channel type after receiving the first channel data (e.g., receive SIB information from the PDSCH after receiving the MIB information), and receive a redundancy version of the first channel data from the first channel type after receiving the second channel data (e.g., receive Redundant MIB Information from the PBCH after receiving SIB information from the PDSCH). Thus, in early reading of the second channel type, radio node may receive SIB information after receiving MIB information and prior to receiving a redundancy version of the MIB information (e.g., before receiving the third redundancy version, before receiving the second and third redundancy version, or before receiving the first, second, and third redundancy version). FIG. 4*b* illustrates an example of early SIB1 reading.

In an example of sparse reading of the second channel type, radio node 105 may receive second channel data from the second channel type (e.g., receive SIB1-A from the PDSCH), skip receiving a first redundancy version of the second channel data such that no autonomous gap is configured to receive the first redundancy version (e.g., skip receiving SIB1-B from the PDSCH), and receive a second redundancy version of the second channel data, the second redundancy version available after the first redundancy version and received using one or more of the autonomous gaps (e.g., receive SIB1-C from the PDSCH). FIG. 4*d* illustrates an example of sparse SIB1 reading.

In some embodiments, radio node 105 determines a number of redundancy versions of data to be received from the second channel type based on interference conditions and configures a number of gaps based on the number of redundancy versions of data to be received from the second channel type. For example, if the second interfering cell is creating strong interference, radio node 105 may be able to skip reading one, two, or three redundancy versions and still adequately read the second interfering channel. Radio node 105 need not configure a gap during the times that it skips reading the redundancy versions. That is, radio node 105 can continue receiving the target channel without having to use a gap to receive the second interfering channel during the times that radio node 105 decides reading the redundancy version can be skipped. If, on the other hand, second interfering cell is creating relatively weaker interference, radio node 105 may decide to read more redundancy versions and may configure a number of gaps corresponding to the number of redundancy versions to be read.

Although the preceding examples have described early reading and/or sparse reading of the second channel type, in certain embodiments early reading and/or sparse reading may be used when reading the first channel type. See, for example, FIGS. 4*b* and 4*c*. In addition, receipt of the target channel and an interfering channel can be time shifted, an example of which is shown in FIG. 4*d*.

At step 336, radio node 105 reduces interference associated with at least one of the first interfering cell and the second interfering cell based on at least one of the first information and the second information. In some embodiments, radio node 105 may use enhanced receiver techniques to reduce (at least some of) the interference. For example, radio node 105 may apply enhanced receiver techniques to reduce interference based on receiving the target PBCH when receiving the interfering PBCH. The method then ends.

In some embodiments, using gaps for reading a target channel may prevent the radio node from receiving an interfering channel at the same time. And the other way around—using gaps for reading an interfering channel may prevent a radio node receiving the target channel at the same time. At least one of the target channel and the interfering channel may be a neighbor-node or neighbor-cell channel. Currently, receiving some broadcast neighbor channels is possible with autonomous gaps, but receiving dedicated channels is typically possible only from the serving cell. Note that measurement gaps are also possible to configure from the network side, but the measurement gaps may not be currently used or even intended for channel reading.

Therefore, one technique provided by the solutions proposed in some embodiments relates to a reduced, or partial, usage of gaps for receiving one or more channels from one or more neighbor nodes or cells. The gaps may be configured by the radio node receiving the channels or configured by a network node in message received by the radio node. The gaps herein are the gaps for receiving one or more channels. For simplicity, further below the terminology "reduced usage of gaps" is herein for one or both of the reduced usage of gaps and partial usage of gaps.

One example of gaps is autonomous gaps. One example of channels is channels comprising SI (e.g., PBCH comprising MIB, PDSCH comprising SIB1, PDSCH comprising other SIBs). Other examples of channels are control channels, PDSCH comprising data, etc.—these channels are currently received only for a serving cell, but may also be received in gaps, according to particular embodiments of the proposed solutions.

In one embodiment, reduced usage of gaps is exercised by a radio node (e.g., a wireless device or radio network node) when receiving channels comprising SI for a non-serving cell, e.g., receiving MIB without configuring or partially configuring autonomous gaps, while configuring autonomous gaps for receiving SIB1 or SIB3. Partially configuring herein may comprise configuring autonomous gaps for a fewer redundancy versions than needed for decoding the channel.

In one embodiment, when a reduced usage of gaps is applied, the radio node may also use a different value for a counter (e.g., T321) compared to when the gaps are normally used and compared to when the gaps are not used at all.

In a further embodiment, when applying the reduced usage of gaps, it may be pre-defined or dynamically configured according to a rule when to use/not to use the gaps. For example, a wireless device or network node may decide whether to reduce gap usage based on one or more of receiver type, reported capability, activation state, number of parallel channel readings, frequency of receiving the channel, encoding robustness, availability of assistance data, radio conditions, pattern, purpose, network controls, or type of neighbor cell.

Reducing gaps based on receiver type, for example, may provide for not configuring autonomous gaps when an enhanced receiver, e.g., capable of interference cancellation, is used. In one example, a PBCH IC capable receiver receives MIB without autonomous gaps but configures autonomous gaps for SIB11 and/or other SIBs Reducing gaps based on reported capability, for example, a CA-capable UE (carrier aggregation; capable of communicating with two or more serving cells simultaneously) may, when operating in a non-CA environment, report that only single serving cell is supported, and instead use the capacity otherwise used for reception of Secondary Cell(s) for receiving MIB and/or SIB1 and/or other SIBs for one or more neighbor cells, without or with partially configured autonomous gaps.

Reducing gaps based on activation state, for example, a CA-capable UE may, when having reported CA capability but not yet been configured with Secondary Cell(s), use the capacity otherwise used for reception of Secondary Cell(s) for receiving MIB and/or SIB1 and/or other SIBs for one or more neighbor cells, without or with partially configured autonomous gaps.

Reducing gaps based on number of parallel channel readings, for example, the UE may be capable of reading one neighbor-cell channel without gaps at a time; this may mean that if the neighbor is the aggressor interferer and there are more than one aggressor interferers transmitting at the same time channels comprising SI, the wireless device may have to receive the channels of the two aggressors in sequence (receive until decode channel 1, then receive until decode channel 2), which may increase the time for reading SI from a cell suffering from the two aggressor cells.

Reducing gaps based on frequency of receiving the channel, for example, if the channel is to be received frequently, then configuring frequent gaps will have a big negative impact on serving cell performance, hence it may be preferred to avoid or reduce usage of gaps in this case; if the channel is to be read infrequently, configuring gaps and then storing the estimates may be more justified.

Reducing gaps based on encoding robustness, for example, no gaps may be justified for robustly encoded channels, e.g., PBCH is more robust so no gaps may be needed, unlike SIB1.

Reducing gaps based on availability of assistance data, for example, assistance data, interferer information, or a neighbor cell list is provided to assist the wireless device in SI reading (e.g., comprising at least PCI of the cell of which the SI is to be read, at least in part), which may make it easier to receiver at least some channels comprising SI without gaps.

Reducing gaps based on radio conditions, for example, the signal strength and/or signal quality of the cell of which a channel comprising SI is to be read without gaps should be above a threshold; especially without any assistance data provided, the threshold may be higher than when gaps may be used for the SI reading.

Reducing gaps based on patterns for allowing/not allowing gaps, for example, there may be a pattern (e.g., pre-defined, defined by a rule, or signaled to the wireless device) which indicates a subset of subframes for measurements and/or channel receptions, and no gaps may be allowed for the radio node in those indicated subframes; a time-domain measurement resource restriction pattern may also serve such purpose. In another example, there may be a pattern (e.g., pre-defined, configured by a pre-defined rule, or signaled by serving eNodeB) when gaps are allowed but may be left up to the UE whether to configure them or not.

Reducing gaps based on purpose, for example, a wireless device may use gaps differently for different purposes, e.g., use gaps for a first request (e.g., handover, CGI request for MDT, SON, cell verification, when configured with si-RequestForHO) and not use gaps for a second request (e.g., measurements in high-interference conditions or aggressor interference estimation). In another example, reduced usage of gaps may apply to the channels comprising SI when the channels are received for the purpose of reading the SI they comprise. In yet another example, reduced usage of gaps may apply to the channels comprising SI when the channels are received for the purpose of mitigating the interference they cause. In yet another example, reduced usage of gaps may be applied for a higher-priority channel reading versus lower priority or best-effort channel reading for which more gaps may be configured.

Reducing gaps based on network-controlled usage of gaps, for example, a network node may send an indicator activating/deactivating usage of gaps. In another example, a network node may include an indicator whether gaps are allowed or not into a measurement request.

Reducing gaps based on type of the neighbor cell for which the channel(s) comprising SI are to be read, for example, partial usage of gaps may apply only to intra-frequency cells. In another example, partial usage of gaps may apply only to intra-RAT cells. In another example, partial usage of gaps may apply only to intra-band cells. In yet another example, partial usage of gaps may apply to any one or more of: intra-frequency, inter-frequency, inter-RAT, or inter-band.

According to particular implementations, there may be a capability comprising a radio node's reduced need for gaps as described above. This capability may represent a stand-alone capability, e.g., no UEs capable of PBCH IC are also capable of receiving PBCH of a neighbor cell without autonomous gaps. The capability may be comprised in a capability associated with an enhanced receiver, e.g., any PBCH IC capable UE is also capable of receiving PBCH without autonomous gaps, or similarly, any SIB1 IC capable UE is also capable of receiving SIB1 without autonomous gaps. The capability may be associated with specific one or more channels, e.g., PBCH or SIB1; in one example, a UE may have a first capability pertaining to receiving PBCH without autonomous gaps and a second capability pertaining to receiving SIB1 without autonomous gaps.

A radio node may signal its capability to another node, or the capability of other radio nodes to yet additional nodes. As an example, wireless device may signal its capability to another radio node (e.g., serving eNodeB or another wireless device). As another example, the wireless device may signal its capability to a network node (e.g., femto gateway, RNC, SON). The node receiving this capability may use it, e.g., for control or a network operation task, e.g., mobility control, CRE and cell reselection control for the wireless device (which in turn also determines the interference the device will have to handle), measurement configuration, measurement pattern adaptation, autonomous gap control by the serving node, UE statistics collection, carrier selection for the radio node, CA configuration (e.g., SCells and PCells configuration, activation, measurement cycle configuration) for the radio node, etc.

Some embodiments may provide methods for adapting channel acquisition with reduced gap usage and/or partial use of gaps. A radio node receiving a channel may have a reduced need for gaps. Hence, it may be capable of receiving in parallel a target channel and an interfering channel, e.g., for one channel type. However, it may still not be capable of receiving another channel type without gaps.

According to some embodiments, the wireless node may rearrange the order of reading the channels, e.g., reading at least some of them sparsely and/or early in order to reduce gap usage. In one example, the arrangement may be done with respect to the channel receptions or traffic activity in the victim cell. In another example, the arrangement may be done with respect to the channel receptions of an aggressor cell. In yet another example, the rearrangement is of channel reception of a victim cell. In yet another example, the rearrangement is of channel reception of an aggressor. In yet another example, the arrangement may be done for acquisition of an aggressor channel, rearrangement with respect to (or accounting for) at least another aggressor cell.

For example, a wireless device with the reduced need for gaps may receive PBCH of one or more neighbor cells (which e.g. may be potential target cell(s), interferer(s), or cell(s) whose CGI is of interest for the RAN) simultaneously with communication with the serving cell without using gaps, but may need gaps for receiving SIB1 and/or other SIB(s) from the neighbor cell(s). When the UE receives SIB1 and/or other SIBs from the neighbor cell using autonomous gaps it may arrange the reading in such manner that it is guaranteed that a subset of RVs (e.g., minimum of 3 out of 4 RVs) of PBCH can be received during a 40 ms period, by receiving SIB11 and/or other SIBs early (see FIG. 4b) and/or sparsely (see FIG. 4c, 4d) or even postpone channel reading (see below).

For instance, for SIB1 the RVs A, B, C, and D are transmitted in that particular order during an 80 ms period, i.e., two RVs are transmitted over a 40 ms period. The UE may schedule the reception in such fashion that the RVs are read for instance in the order A, C, B, D, by which at most one autonomous gap is created per 40 ms period. Several other patterns may achieve the same result. Moreover, the UE may schedule the acquisition of necessary RVs in such manner that all are taken within the same SI modification period by assuming the shortest possible modification periods unless the UE has information on the particular modification period in use. During a modification period the relevant system information remains consistent.

FIGS. 4a-4d are diagrams illustrating embodiments of channels received from a target cell and a receiving cell. In FIGS. 4a-4d, the top row illustrates channels received from an aggressor cell and the bottom row illustrates channels received from a victim cell (in FIG. 4d, the middle row illustrates channels received from a second aggressor cell). The numbers 1, 2, 3, and 4 refer to MIB information, first redundancy version of MIB information, second redundancy version of MIB information, and third redundancy version of MIB information, respectively. The letters A, B, C, and D refer to SIB information, first redundancy version of SIB information, second redundancy version of SIB information, and third redundancy version of SIB information, respectively. Redundancy version may be abbreviated RV. FIGS. 4a-4d illustrate that a group comprising a particular instance of MIB information and its corresponding 3 redundancy versions and a particular instance of SIB information and its corresponding 3 redundancy versions may be transmitted by the victim/aggressor cell in the order of 1, A, 2, 3, B, 4, 1, C, 2, 3, D, 4. The black squares illustrate when the channel is received and the white squares indicate when the channel is not received. The circles illustrate when a gap occurs.

Figure 4A:
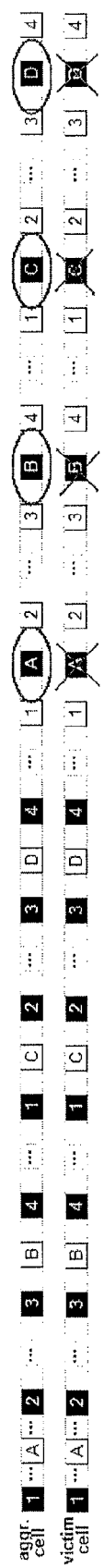
FIGS. 4a-4d are diagrams illustrating embodiments of channels received from a target cell and an interfering cell.
Figure 4B:
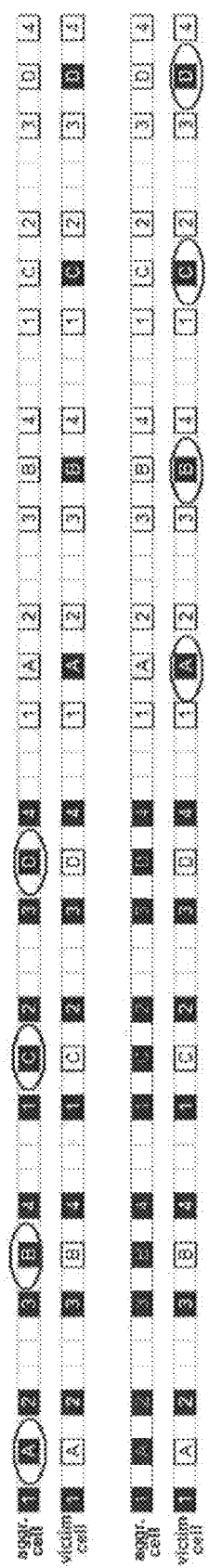

FIG. 4a illustrates the prior-art where the UE reads the MIB (including each redundancy version of MIB) before reading SIB1 (or any redundancy version of SIB). If the UE needs to handle SIB1 interference but needs gaps for reading aggressor SIB1, while being able to handle PBCH without interference, the above channel acquisition schedule is a problem since victim and aggressor SIB1 cannot be read at the same time.

FIG. 4b illustrates an embodiment of the present disclosure with early SIB1 reading. The UE may still read SI of the victim cell, use gaps for reading SIB1 of one (like in the examples above) or both of the cells, depending on which cell is the serving, and still meet the existing SI reading requirement (150 ms), while being able to handle PBCH interference and also SIB1 interference. Gaps may be used for SIB1 but not for PBCH, i.e., the need for configuring gaps may be reduced for some channel (PBCH). In FIG. 4B, the radio node reads MIB-1 followed by SIB1-A followed by MIB-2 (RV1) followed by MIB-3 (RV2) followed by SIB1-B (RV1) and so on. Thus, rather than waiting for each redundancy version of MIB information to be read before reading any SIB1 information, certain SIB1 information may be read early (e.g., before reading certain MIB information).

Figure 4C:
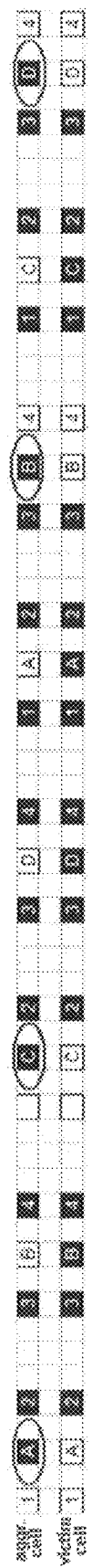
Figure 4D:
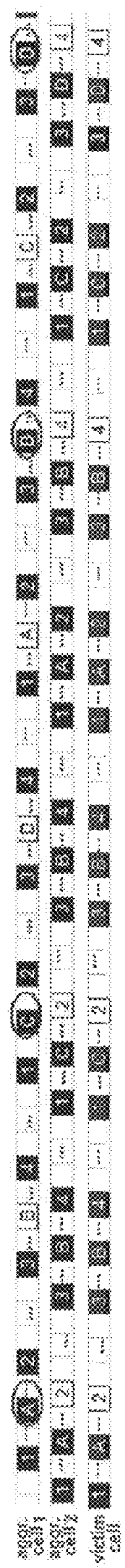

FIG. 4c illustrates an embodiment of the present disclosure with sparse SIB1 reading. For example, in FIG. 4c the UE reads SIB1-A, skips SIB1-B (redundancy version 1), reads SIB1-C (redundancy version 2), and skips SIB1-D (redundancy version 3) (then skips SIB1-A, reads SIB1-B, skips SIB1-C, and reads SIB1-D). The UE may still read SI of the victim cell, use gaps for reading SIB1 of one or both of the cells, depending on which cell is the serving, and still meet the existing requirement (150 ms), while being able to handle PBCH interference and also SIB1 interference. Gaps may be used for SIB1 but not for PBCH, i.e., the need for configuring gaps may be reduced for some channel (PBCH), but also gap configuration is made more sparse (not more often than once per 40 ms) compared to FIG. 4a.

FIG. 4d illustrates an embodiment of the present disclosure with sparse reading of SIB1 for a time-shifted aggressor cell. The UE may still read channels comprising SI on other cells, minimizing the number of lost RVs for a channel with a shorter periodicity (PBCH in this example), to enable PBCH reading of victim and IC of PBCH interference to the victim cell. Here, autonomous gaps configured for SIB1 of the aggressor 1 overlap and destroy PBCH reception of aggressor 2 and victim cells.

According to one embodiment, a wireless device may implement two or more strategies for channel receiving and may select among the strategies, adaptively to one or more conditions and/or by a pre-defined rule. In one example, a wireless device may be capable of using both (i) a channel receiving approach with no reduced usage of gaps and (ii) a channel receiving approach with reduced gaps usage; and adaptively selects between the two depending on interference conditions. In another example, a wireless device may be capable of using both (i) a channel receiving approach with reduced gap usage and (ii) a channel receiving approach without using gaps; and adaptively selects between the two depending on a condition.

In yet another example, a wireless device may implement two or more strategies for channel receiving with reduced gap usage, e.g., one with receiving a channel early and one with postponed receiving of a channel. A UE may select different strategies regarding acquisition of SIB1 and/or other SIB(s) from a neighbor cell depending on signal conditions for one or more of the cells for which the UE is to receive PBCH. When receiving PBCH from a strong aggressor cell only (which experiences low interference), it might be enough to capture two PBCH (MIB) RVs during the time period of 40 ms for successful decoding. In such case SIB1 and/or SIB(s) from other neighbor cell might not have to be read sparsely. In other conditions when signal conditions are worse, i.e., the interference is higher, the UE may select the approach outlined above, by which SIB1 and/or other SIBs are read sparsely. In yet worse signal conditions, i.e. where the interference is even worse and where it is assessed that all 4 RVs of PBCH are needed for successful decoding, the UE may choose to ignore or postpone the reading of SIB1 and/or other SIB(s) from other neighbor cell in order to avoid puncturing the reception by autonomous measurement gaps. The decision on whether to ignore or postpone the acquisition of SIB1 and/or other SIB(s) may depend on signaling from the radio node network. For instance, if the UE is requested to get the CGI of a neighbor cell for handover purpose (e.g. via existing si-RequestForHO information element) it may prioritize to acquire SIB1 and/or other SIB(s), whereas if not provided with such signaling, the UE may assume that the CGI request is for best effort-services such as SON ANR, or MDT, and hence puts lower priority to this request and ignores or postpones it until signal conditions have improved and the UE can read PBCH using 3 RVs or less.

The wireless device may also select a strategy based on the number of strong interferers and the enhanced receiver capability (e.g., a receiver may be capable of cancelling up to 2 interfering channels). To assess interference level, the wireless device may conclude that interference is high, e.g., when one or more of the following holds (and the other way around—the interference level may be assumed as low if one or more of the conditions do not hold): the signal quality is below a threshold, the interfering signal is above a threshold, the received total interference is above a threshold, the predicted signal quality is low, e.g., predicted based on CRS or synchronization signal estimates (time alignment between aggressor and victim cell may also be taken into account), the wireless device is configured with a measurement pattern to enable measurements in high-interference conditions, the wireless device is provided with assistance data for handling high interference (e.g., CRS assistance data).

Figure 5:
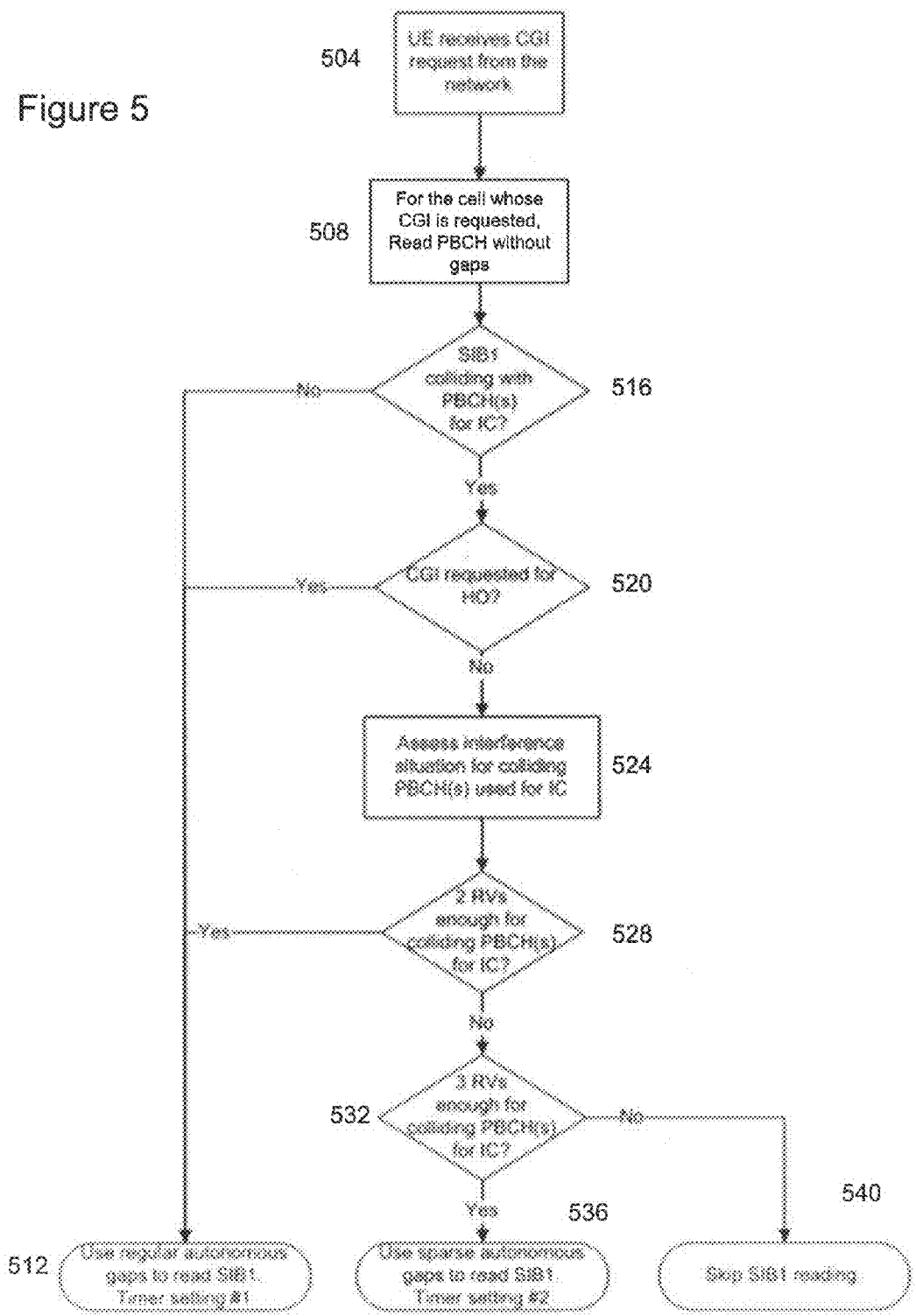
FIG. 5 illustrates an example flow chart for determining a gap usage strategy.

In some embodiments, a UE reading redundancy versions (RVs) from SIB1 and/or other SIB(s) according to the approach above may use a different timer setting (e.g. for T321) than if the gaps had not been used at all, or than if Rel8/9/10 autonomous gaps had been used. A radio network node that orders a UE to report CGI that is aware that the UE uses reduced gaps (e.g., via a pre-determined rule applied by the UE, via capability reporting by the UE to the radio network node, by commands from the radio network node to the UE, or other approach) may use a different timer setting than if gaps were not required by the UE, or than if Rel8/9/10 autonomous gaps had been used. Another different time setting may be used if a channel reading is postponed as described above. FIG. 5 illustrates an example decision-making process for a wireless device attempting to decide what gap usage strategy to utilize based on the reason the CGI reading was requested, as well as on the interference conditions. In FIG. 5, a wireless device selects different approaches for autonomous gaps depending on request from the network (for HO, or other purpose), and based on interference scenario for the interfering cell whose PBCH needs to get successfully decoded in order to be successfully cancelled.

At step 504, the UE receives CGI request from the network, the request may trigger using autonomous gaps in the UE. In step 508, the UE reads the PBCH for the cell whose CGI is requested in step 504. The PBCH is read without gaps. At step 516, the UE checks for a SIB1 collision with the PBCH(s). If there is no interference problem between SIB1 and the PBCH, the UE goes to step 512 and uses regular autonomous gaps to read SIB1 (timer setting #1). If there is an interference problem, the UE goes to step 520 and checks if the CGI requests for a handover. In the case of a handover, the UE goes to step 512 and uses the first timer setting to read SIB1 with autonomous gaps. In the case of no handover, the UE assesses the interference situation for colliding PBCH(s) used in interference cancellation at step 524. The UE may estimate how strong the interference is. If the aggressor cell is strong the UE may get a stronger signal from the aggressor. A stronger signal may provide more information and allow for a more accurate estimate (which may make it easier to mitigate/subtract the interference). At step 528, if the UE determines that the interference is strong (e.g., exceeds a threshold), it may determine that it only needs to read 2 redundancy versions (and can skip the other redundancy version(s)) and, thus, may go to step 512 to use the first timer setting. If the UE determines that the interference is weak (e.g., below a threshold), it may proceed to step 532 to determine if reading three redundancy versions (in addition to the original version) is sufficient for interference cancellation. If yes, the UE goes to step 536 and uses sparse autonomous gaps to read SIB1 (using a second timer setting). If no, the UE goes to step 540 and skips the SIB1 reading. Thus, the UE may use two timers (e.g., depending on whether or not sparse autonomous gaps are used).

In some embodiments, a wireless device may adapt its operation or configuration to meet certain pre-defined requirements, and a network node (e.g., eNodeB, positioning node, MDT node, SON node, etc.) may provide its assistance for the wireless device, configure the wireless device, or adapt its scheduling or measurement/channel reception configuration to meet certain pre-defined requirements. The wireless device and/or network node may implement embodiments described in Solutions 1-2 above and may be required to meet a first set of one or more requirements. The first set of requirements may be different from the prior-art requirements.

For example, it may be required to obtain SI, report measurements (which may also include CGI), report a channel feedback, or respond to/confirm the data received in the (victim and/or aggressor) channel within a certain time and/or with a certain pre-defined measurement accuracy level. In another example, it may be required to receive and decode an aggressor channel using up to a certain number of redundancy versions (less than 4). In yet another example, a wireless device may be required to receive and decode a channel with a certain maximum BLER. In yet another example, a wireless device may be required a certain minimum number of ACK/NACKs.

One example of a pre-defined requirement may be that wireless device should not use autonomous gaps for a certain channel, e.g., for PBCH, if capable of PBCH IC. Another example of a pre-defined requirement may be that a wireless device should not use autonomous gaps in subframes indicated for measurements by restricted measurement resource patterns. Another example of a pre-defined requirement may be that reduced usage of gaps shall apply for a specific type of channel acquisition, e.g., for intra-frequency, intra-RAT, or intra-band. Another example of a pre-defined requirement may be that a wireless device should not use autonomous gaps for receiving the interfering channel in subframnes indicated for measurements by restricted measurement resource patterns. Another example of a pre-defined requirement may be that reduced usage of gaps shall apply for at least N cells (e.g., N=2), whilst other than N cells autonomous gaps may still be used. Another example of a pre-defined requirement may be that a wireless device using enhanced receiver should meet a first set of requirements when assistance data (e.g., with aggressor cell information or CRS assistance information) is provided and a second, different, set of requirements when no assistance is provided. Another example of a pre-defined requirement may be that a wireless device may be required to use only network-configured gaps in certain subframes. Another example of a pre-defined requirement may be that a wireless device may use autonomous gaps if the performance degradation which may be caused by using autonomous gaps does not exceed a certain level. Another example of a pre-defined requirement may be that a wireless device may delay CGI reporting (e.g., postpone the measurement with autonomous gaps or extend the measurement time to acquire CGI) when using enhanced receiver for interference mitigation. Another example of a pre-defined requirement may be that the reduced usage of autonomous gap, due to less interruption on the serving cell, may also cause less impact on other measurements, e.g., measurement time for RLM, UE Rx-Tx, CSI reporting, channel demodulation.

The requirements may apply in certain conditions or may have different levels in certain conditions (compared to when the conditions are not met), e.g., in one or more of the following interference conditions, the signal strength and/or quality of the channel to be received is above a threshold, time and/or frequency synchronization conditions, time alignment conditions, Es/Iot of the victim signal/channel, DRX configured, the autonomous gaps are autonomous gaps for intra-frequency measurements/channel reception, and/or aggressor information is provided.

The solutions proposed herein including, e.g., the methods of adapting receiver, scheduling, and measurement configuration, and the methods of meeting a pre-defined requirement (e.g., as described above) may also be configured in the test equipment (TE) node (aka system simulator (SS) or test system (TS)). The TE or SS may implement all configuration methods related to embodiments applicable to different nodes e.g. wireless device, serving radio node, positioning node, SON node, MDT node, etc. in order to verify pre-defined requirements and procedures described in preceding sections.

The purpose of such testing would be to verify that the corresponding device/node is compliant to the pre-defined rules, protocols, signaling and requirements associated with simultaneous channel reception and/or usage of enhanced receiver.

Typically the TE or SS or TS separately performs tests for UB/wireless device and radio network nodes. The testing may be measurement-specific and may be capability-dependent. For example, requirements described in preceding section may be verified with such TE or SS.

For UE testing, the TE or SS may also be capable of receiving the measurement results from a wireless device and analyzing the received results e.g. comparing the measurement result or the statistics of the measurement results (e.g., with 90% confidence) obtained in the test with the reference results to determine whether measuring device is compliant to the requirements or not. The reference can be based on the pre-defined requirements or UE behavior or theoretical estimate or performed by a reference device. The reference device can be part of TE or SS.

Although the described solutions may be implemented in any appropriate type of telecommunication system supporting any suitable communication standards and using any suitable components, particular embodiments of the described solutions may be implemented in an LTE network, such as the example network shown in FIG. 1 above. As shown by FIG. 1, an example network may include one or more wireless devices (e.g., radio node 105) and one or more radio network nodes (e.g., target cell 110, interfering cell 120, etc.) capable of communicating with these wireless devices.

The network may also include any additional elements suitable to support communication between wireless devices or between a wireless device and another communication device (such as a landline telephone). A wireless device may include any suitable combination of hardware and/or software. For example, in particular embodiments, a wireless device may include the components described with respect to FIG. 6 below. Similarly, a radio network node may include any suitable combination of hardware and/or software. For example, in particular embodiments, a radio access node may include the components described with respect to FIG. 7 below. Also, as shown in FIG. 1, the example network may include multiple different types of radio network nodes including, for example, macro cell nodes (e.g., base stations, eNodeBs), low-power nodes (e.g., pico-, femto-, or other micro-base stations, home eNodeBs), and relay nodes. Although FIG. 1 illustrates an embodiment in which radio node 105 corresponds to a wireless device (such as wireless device 600 illustrated in FIG. 6), in other embodiments radio node 105 could be a radio network node (such as radio network node 700 illustrated in FIG. 7).

Figure 6:
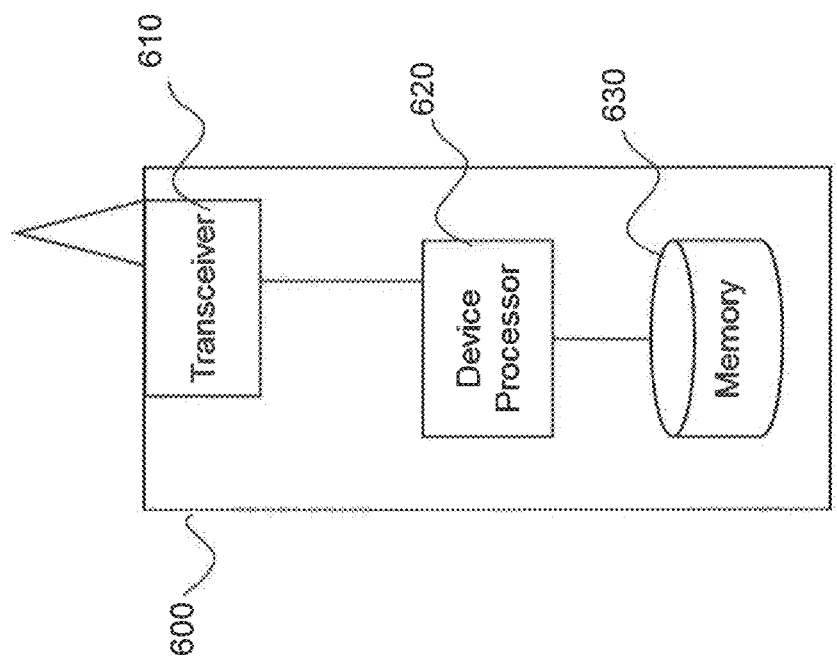
FIG. 6 is a block diagram illustrating embodiments of a radio node.

FIG. 6 is a block diagram illustrating embodiments of a wireless device 600. Examples of wireless device 600 include a mobile phone, a smart phone, a PDA (Personal Digital Assistant), a portable computer (e.g., laptop, tablet), or other device that can provide wireless communication. A wireless device 600 may also be referred to as user equipment (UE), a station (STA), or a terminal in some embodiments. Wireless device 600 comprises transceiver 610, processor 620, and memory 630. In some embodiments, transceiver 610 facilitates transmitting wireless signals to and receiving wireless signals from a radio network node (e.g., via an antenna), processor 620 executes instructions to provide some or all of the functionality described above as being provided by wireless devices, and memory 630 stores the instructions executed by processor 620.

Processor 620 may comprise any suitable combination of hardware and software implemented in one or more modules to execute instructions and manipulate data to perform some or all of the described functions of wireless device 600. In some embodiments, processor 620 may include, for example, one or more computers, one or more central processing units (CPUs), one or more microprocessors, one or more applications, and/or other logic.

Memory 630 is generally operable to store instructions, such as a computer program, software, an application comprising one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Alternative embodiments of wireless device 600 may include additional components beyond those shown in FIG. 6 that may be responsible for providing certain aspects of the wireless device's functionality, including any of the functionality described above and/or any additional functionality (including any functionality necessary to support the solution described above).

FIG. 7 is a block diagram illustrating embodiments of a radio network node 700. Examples of radio network node 700 include an eNodeB, a base station, a Wi-Fi access point, a low-power node, and so on. Radio network node 700 comprises transceiver 710, processor 720, memory 730, and network interface 740. In some embodiments, transceiver 710 facilitates transmitting wireless signals to and receiving wireless signals from a wireless device (e.g., via an antenna), processor 720 executes instructions to provide some or all of the functionality described above as being provided by a radio network node, memory 730 stores the instructions executed by processor 720, and network interface 740 communicates signals to backend network components, such as a gateway, switch, router, Internet, Public Switched Telephone Network (PSTN), etc.

Processor 720 may comprise any suitable combination of hardware and software implemented in one or more modules to execute instructions and manipulate data to perform some or all of the described functions of radio network node 700. In some embodiments, processor 720 may include, for example, one or more computers, one or more central processing units (CPUs), one or more microprocessors, one or more applications, and/or other logic.

Memory 730 is generally operable to store instructions, such as a computer program, software, an application comprising one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for radio network node 700, send output from radio network node 700, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Alternative embodiments of radio network node 700 may include additional components beyond those shown in FIG. 7 that may be responsible for providing certain aspects of the access node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Particular embodiments of the disclosure could be implemented within the context of a telecommunication standard. As a non-limiting example, some embodiments could be implemented within the framework of the 3GPP specification 3GPP TS 36.133 "Evolved Universal Terrestrial Radio Access (E-UTRA); Requirements for support of radio resource management," v11.3.0, December 2012 (the "3GPP Specification"), which is incorporated herein by reference for purposes of implementing certain embodiments of the proposed solutions. Standards proposals could require that in FeICIC scenarios (e.g., when the UE is configured with a measurement pattern and provided with the CRS assistance information) the autonomous gaps are not created at least for PBCH by PBCH IC capable UEs; in this case, the Rel-10 SI reading requirements may potentially be reused when autonomous gaps are not created for PBCH. This proposal may or may not be limited to subframes indicated for restricted measurement subframes. Another proposal could limit the scenarios when autonomous gaps are required and study whether extending the time for SI reading with autonomous gaps is necessary in high-interference conditions.

Examples of the proposals could be implemented in the 3GPP Specification at Section 8.1.2.8 (E-UTRAN intra-frequency measurements under time domain measurement resource restriction). Section 8.1.2.8 could include a section for E-UTRAN FDD intra frequency measurements with autonomous gaps that provides, "When a time-domain measurement resource restriction pattern is configured via higher-layer signaling (TS 36.331 [2]) for performing intra-frequency measurements, the requirements in Section 8.1.2.2.3 shall apply, under the following additional conditions . . . UE capable of PBCH IC shall not configure autonomous gaps for acquiring PBCH of a neighbor cell in the subframes indicated by the pattern." Section 8.1.2.8 could include a section for E-UTRAN TDD intra frequency measurements with autonomous gaps that provides, "When a time-domain measurement resource restriction pattern is configured via higher-layer signaling (TS 36.331 [2]) for performing intra-frequency measurements, the requirements in Section 8.1.2.2.4 shall apply, under the following additional conditions . . . UE capable of PBCH IC shall not configure autonomous gaps for acquiring PBCH of a neighbor cell in the subframes indicated by the pattern." The changes described are merely intended to illustrate how certain aspects of the proposed solutions could be implemented in a particular standard. However, the proposed solutions could also be implemented in other suitable manners, both in the 3GPP Specification and in other specifications or standards.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. For example, although some embodiments have been described with reference to certain radio access technologies, any suitable radio access technology (RAT) may be used, such as long term evolution (ITE), LTE-Advanced, UMTS, HSPA, GSM, cdma2000, WiMax, and WiFi. Moreover, various embodiments may support single-RAT or multi-RAT configurations. In addition the proposed solutions may also be applied to multi-point transmission and/or reception systems, carrier aggregation systems, and multi-point carrier aggregation systems. Accordingly, the above description of the embodiments does not constrain this disclosure. Other changes, substitutions, and alterations are possible without departing from the spirit and scope of this disclosure, as defined by the following claims.

ABBREVIATIONS

3GPP 3rd Generation Partnership Project
ABS Almost Blank Subframe
ANR Automatic Neighbor Relation
BCCH Broadcast Control CHannel
BCH Broadcast CHannel
BS Base Station
CA Carrier Aggregation
CGI Cell Global Identifier
CSG Closed Subscriber Group
CSI Channel State Information
CRS Cell-specific Reference Signal
DCI Downlink Control Information
DL Downlink
DL-SCH Downlink Shared CHannel
DRX Discontinuous Reception
ECGI Evolved Cell Global Identifier
EDGE Enhanced Data rates for GSM Evolution
eNodeB evolved Node B
E-SMLC Evolved SMLC
eICIC Enhanced Inter-Cell Interference Coordination
FDD Frequency Division Duplex
GERAN GSM EDGE Radio Access Network
GSM Global System for Mobile communications
HSDPA High-Speed Downlink Packet Access
HSPA High-Speed Packet Access
HRPD High Rate Packet Data
ICIC Inter-Cell Interference Coordination
LTE Long-Term Evolution
LMU Location Measurement Unit
MBSFN Multicast-Broadcast Single Frequency Network
MCS Modulation and Coding Scheme
MDT Minimization of Drive Tests
MIB Master Information Block
MME Mobility Management Entity
MMSE-IRC Mean Square Error—Interference Rejection Combining
MMSE-SIC Minimum Mean Square Error-Successive Interference Cancellation
O&M Operation & Maintenance
OSS Operating Support System
PBCH Physical Broadcast Channel
PCI Physical Cell Identity
PCFICH Physical Control Format Indicator CHannel
PDCCH Physical Downlink Control CHannel
PDN Packet Data Network
PDSCH Physical Downlink Shared CHannel
P-GW PDN Gateway
PHICHI Physical Hybrid-ARQ Indicator CHannel
PLMN Public Land Mobile Network
PRS Positioning Reference Signals
PSAP Public Safety Answering Point
PSS Primary Synchronization Signal
RAN Radio Access Network
RAT Radio Access Technology
RF Radio Frequency
RLM Radio Link Management
RNTI Radio Network Temporary Identifier
RRC Radio Resource Control
RRH Remote Radio Head
RRM Radio Resource Management
RRU Remote Radio Unit
RSRP Reference Signal Received Power
RSRQ Reference Signal Received Quality
RSSI Received Signal Strength Indicator
RSID Reference Signal Time Difference
RV Redundancy Version
S-GW Serving Gateway
SFN System Frame Number
SI System Information
SIB System Information Block
SINR Signal to Interference plus Noise Ratio
SI-RNTI System Information RNTI
SON Self-Optimized Network
SRS Sounding Reference Signals
SS System Simulator
SSS Secondary Synchronization Signal
TDD Time-Division Duplex
TE Test Equipment
TS Test System
UL Uplink
UE User Equipment
UMTS Universal Mobile Telecommunications System

What is claimed:

1. A method in a radio node comprising an enhanced receiver, the method comprising:
receiving a first target channel from a target cell, the first target channel comprising a first type of physical channel ("first channel type");

receiving a first interfering channel when receiving the first target channel, the first interfering channel comprising the first channel type and received from a first interfering cell;

determining first information based on receiving the first target channel and the first interfering channel;

receiving a second target channel from the target cell, the second target channel comprising a second type of physical channel ("second channel type");

receiving a second interfering channel from a second interfering cell, the second interfering channel comprising the second channel type, wherein the radio node uses one or more gaps impacting receipt of the second interfering channel relative to receipt of the second target channel;

determining second information based on receiving the second target channel and the second interfering channel;

determining, based on the first channel type, to use an enhanced receiver technique to reduce interference associated with the first channel type, the enhanced receiver technique based on receiving the first interfering channel when receiving the first target channel;

determining, based on the second channel type, to use a second receiver technique to reduce interference associated with the second channel type, wherein the second receiver technique does not require receiving the second target channel when receiving the second interfering channel;

reducing the interference associated with the first channel type using the enhanced receiver technique; and reducing the interference associated with the second channel type when the one or more gaps impact receipt of the second interfering channel relative to receipt of the second target channel, wherein reducing interference associated with the second channel type comprises using the second receiver technique.

2. The method of claim 1, further comprising:
determining a number of redundancy versions of data to be received from the second channel type based on interference conditions;
configuring a number of the one or more gaps based on the number of redundancy versions of data to be received from the second channel type.

3. The method of claim 1, wherein the radio node configures no more than one gap per a 40 millisecond time period.

4. The method of claim 1, further comprising:
receiving first channel data from the first channel type;
receiving second channel data from the second channel type, the second channel data received using one or more of the gaps and after receiving the first channel data; and
receiving a redundancy version of the first channel data from the first channel type, the redundancy version received after receiving the second channel data.

5. The method of claim 1, further comprising:
receiving second channel data from the second channel type, the second channel data received using one or more of the gaps;
determining to skip receiving a first redundancy version of the second channel data such that no gap is configured to receive the first redundancy version; and
receiving a second redundancy version of the second channel data, the second redundancy version available after the first redundancy version and received using one or more of the gaps.

6. The method of claim 1, wherein:
the first channel type corresponds to a Physical Broadcast Channel (PBCH) and the first information comprises Master Information Block (MIB) information; and
the second channel type corresponds to a Physical Downlink Shared Channel (PDSCH) and the second information comprises System Information Block (SIB) information.

7. The method of claim 6, further comprising facilitating early receipt of the SIB information wherein the radio node receives the SIB information after receiving the MIB information and prior to receiving a redundancy version of the MIB information.

8. The method of claim 1, wherein the first interfering cell and the second interfering cell are the same.

9. The method of claim 1, wherein the target cell is a serving cell.

10. The method of claim 1, wherein the target cell is a non-serving cell.

11. The method of claim 1, wherein the one or more gaps comprise at least one of: autonomous gaps and measurement gaps.

12. The method of claim 1, wherein the gaps are configured by a network node in a message received by the radio node.

13. The method of claim 1, wherein receiving the first channel type further comprises one or more of: early reading of the first channel type and sparse reading of the first channel type.

14. The method of claim 1, wherein receiving the second channel type further comprises one or more of: early reading of the second channel type and sparse reading of the second channel type.

15. A radio node comprising a memory and a processor coupled to the memory for carrying out the functions of an enhanced receiver, the processor operable to:
receive a first target channel from a target cell, the first target channel comprising a first type of physical channel ("first channel type");
receive a first interfering channel when receiving the first target channel, the first interfering channel comprising the first channel type and received from a first interfering cell;
determine first information based on receiving the first target channel and the first interfering channel;
receive a second target channel from the target cell, the second target channel comprising a second type of physical channel ("second channel type");
receive a second interfering channel from a second interfering cell, the second interfering channel comprising the second channel type, wherein the radio node uses one or more gaps impacting receipt of the second interfering channel relative to receipt of the second target channel;
determine second information based on receiving the second target channel and the second interfering channel;
determine, based on the first channel type, to use an enhanced receiver technique to reduce interference associated with the first channel type, the enhanced receiver technique based on receiving the first interfering channel when receiving the first target channel;
determine, based on the second channel type, to use a second receiver technique to reduce interference associated with the second channel type, wherein the second receiver technique does not require receiving the second target channel when receiving the second interfering channel;

reduce the interference associated with the first channel type using the enhanced receiver technique; and reduce the interference associated with the second channel type when the one or more gaps impact receipt of the second interfering channel relative to receipt of the second target channel, wherein reducing interference associated with the second channel type comprises using the second receiver technique.

16. The radio node of claim 15, further operable to:
determine a number of redundancy versions of data to be received from the second channel type based on interference conditions;
configure a number of the one or more gaps based on the number of redundancy versions of data to be received from the second channel type.

17. The radio node of claim 15, wherein the radio node configures no more than one gap per a 40 millisecond time period.

18. The radio node of claim 15, further operable to:
receive first channel data from the first channel type;
receive second channel data from the second channel type, the second channel data received using one or more of the gaps and after receiving the first channel data; and
receive a redundancy version of the first channel data from the first channel type, the redundancy version received after receiving the second channel data.

19. The radio node of claim 15, further operable to:
receive second channel data from the second channel type, the second channel data received using one or more of the gaps;
determine to skip receiving a first redundancy version of the second channel data such that no gap is configured to receive the first redundancy version; and
receive a second redundancy version of the second channel data, the second redundancy version available after the first redundancy version and received using one or more of the gaps.

20. The radio node of claim 15, wherein:
the first channel type corresponds to a Physical Broadcast Channel (PBCH) and the first information comprises Master Information Block (MIB) information; and
the second channel type corresponds to a Physical Downlink Shared Channel (PDSCH) and the second information comprises System Information Block (SIB) information.

21. The radio node of claim 20, the radio node further operable to:
facilitate early receipt of the SIB information wherein the radio node receives the SIB information after receiving the MIB information and prior to receiving a redundancy version of the MIB information.

* * * * *